United States Patent
Herbert et al.

(10) Patent No.: US 11,719,960 B1
(45) Date of Patent: Aug. 8, 2023

(54) GRAVITY SAG COMPENSATION IN FLUID-FILLED LENSES

(71) Applicant: META PLATFORMS TECHNOLOGIES, LLC, Menlo Park, CA (US)

(72) Inventors: Andrew Alexander Herbert, Bedfordshire (GB); Thomas Norman Llyn Jacoby, Oxfordshire (GB); Hayden Erik Hernández, Oxford (GB); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 376 days.

(21) Appl. No.: 16/869,222

(22) Filed: May 7, 2020

Related U.S. Application Data

(60) Provisional application No. 62/849,010, filed on May 16, 2019.

(51) Int. Cl.
*G02C 7/08* (2006.01)
*G02B 1/06* (2006.01)
*G02B 27/01* (2006.01)

(52) U.S. Cl.
CPC ............ *G02C 7/088* (2013.01); *G02B 1/06* (2013.01); *G02B 27/0172* (2013.01); *G02B 2027/0178* (2013.01)

(58) Field of Classification Search
CPC ...... G02C 7/088; G02B 1/06; G02B 27/0172; G02B 2027/0178

USPC ......................................................... 359/665
See application file for complete search history.

(56) References Cited

U.S. PATENT DOCUMENTS

| | | | |
|---|---|---|---|
| 4,890,903 A * | 1/1990 | Treisman | G02C 7/085 |
| | | | 359/666 |
| 5,138,494 A | 8/1992 | Kurtin | |
| 5,371,629 A | 12/1994 | Kurtin et al. | |
| 5,668,620 A | 9/1997 | Kurtin et al. | |
| 5,696,521 A | 12/1997 | Robinson et al. | |
| 5,956,183 A | 9/1999 | Epstein et al. | |
| 5,999,328 A | 12/1999 | Kurtin et al. | |
| 7,256,943 B1 | 8/2007 | Kobrin et al. | |
| 8,254,034 B1 | 8/2012 | Shields et al. | |
| 9,036,264 B2 * | 5/2015 | Gupta | G02B 3/14 |
| | | | 359/666 |
| 9,405,045 B2 * | 8/2016 | Lee | G02B 3/14 |
| 10,634,824 B1 | 4/2020 | Ouderkirk et al. | |
| 11,086,132 B2 * | 8/2021 | Stevens | G02C 7/085 |
| 2003/0095336 A1 | 5/2003 | Floyd | |
| 2004/0156983 A1 | 8/2004 | Moravec et al. | |

(Continued)

FOREIGN PATENT DOCUMENTS

| | | |
|---|---|---|
| WO | 2013/143630 A1 | 10/2013 |
| WO | 2018/158347 A1 | 9/2018 |
| WO | 2019/186181 A1 | 10/2019 |

*Primary Examiner* — Collin X Beatty
(74) *Attorney, Agent, or Firm* — Greenberg Traurig, LLP

(57) ABSTRACT

Examples include a device including a fluid lens having a membrane, a substrate, and a fluid at least partially enclosed between the membrane and the substrate. The membrane may have a spatial variation in at least one membrane parameter along a particular direction, that may compensate for gravity sag in the membrane of the fluid lens when the device is worn by a user. Examples also include related methods and systems.

18 Claims, 29 Drawing Sheets

(56) References Cited

U.S. PATENT DOCUMENTS

| | | |
|---|---|---|
| 2006/0077562 A1 | 4/2006 | Silver |
| 2006/0163612 A1 | 7/2006 | Kouvetakis et al. |
| 2007/0279585 A1 | 12/2007 | Bartoli |
| 2008/0001169 A1 | 1/2008 | Lochtefeld |
| 2008/0207846 A1 | 8/2008 | Henze et al. |
| 2008/0239503 A1 | 10/2008 | Conradi et al. |
| 2008/0257409 A1 | 10/2008 | Li et al. |
| 2009/0147371 A1 | 6/2009 | Lee et al. |
| 2010/0068866 A1 | 3/2010 | Yu et al. |
| 2010/0118413 A1 | 5/2010 | Kim et al. |
| 2010/0176375 A1 | 7/2010 | Lochtefeld |
| 2010/0182703 A1 | 7/2010 | Bolis |
| 2010/0252861 A1 | 10/2010 | Lochtefeld |
| 2011/0085131 A1 | 4/2011 | Gupta et al. |
| 2011/0085243 A1 | 4/2011 | Gupta et al. |
| 2012/0041553 A1 | 2/2012 | Gupta et al. |
| 2012/0287512 A1 | 11/2012 | Egan et al. |
| 2014/0077220 A1 | 3/2014 | Kryliouk et al. |
| 2014/0253873 A1 | 9/2014 | Crosby et al. |
| 2014/0261611 A1 | 9/2014 | King et al. |
| 2015/0055084 A1 | 2/2015 | Stevens et al. |
| 2015/0116656 A1 | 4/2015 | Stevens et al. |
| 2015/0185480 A1 | 7/2015 | Ouderkirk et al. |
| 2016/0049299 A1 | 2/2016 | Ko et al. |
| 2016/0223837 A1 | 8/2016 | Holland et al. |
| 2017/0269378 A1 | 9/2017 | Stevens et al. |
| 2019/0097080 A1 | 3/2019 | Ide |
| 2019/0258084 A1* | 8/2019 | Stevens ............ B29D 11/00009 |

* cited by examiner

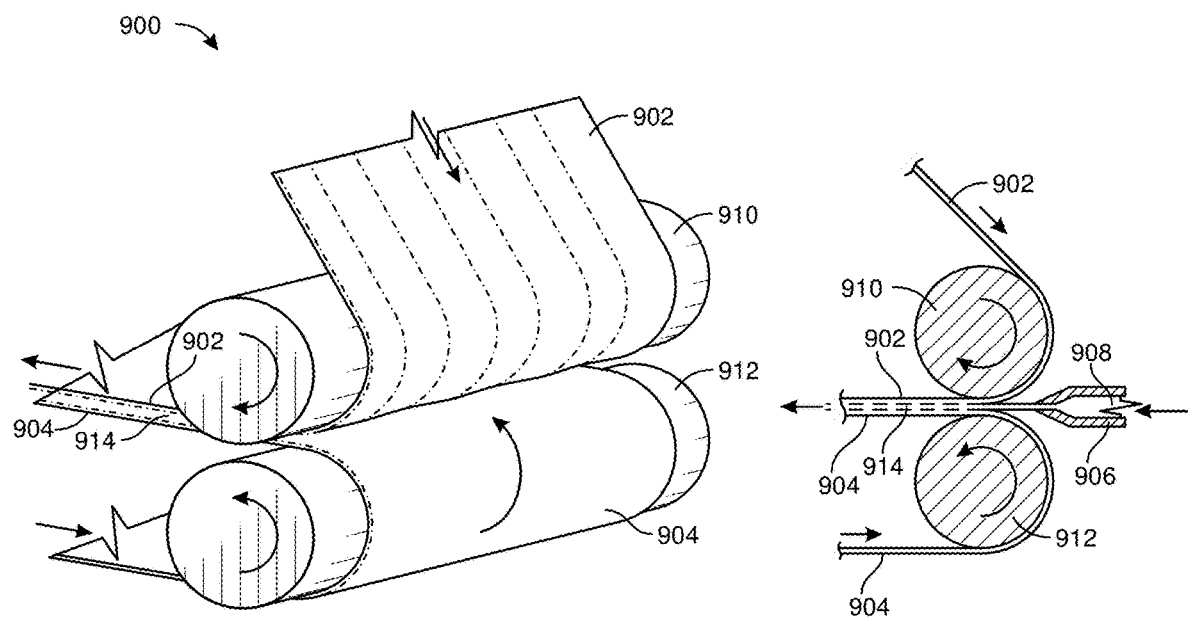
FIG. 9A
FIG. 9B
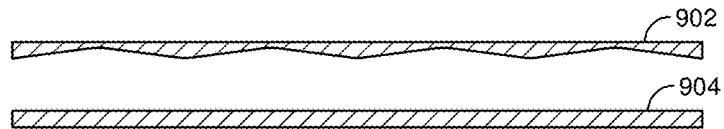
FIG. 9C

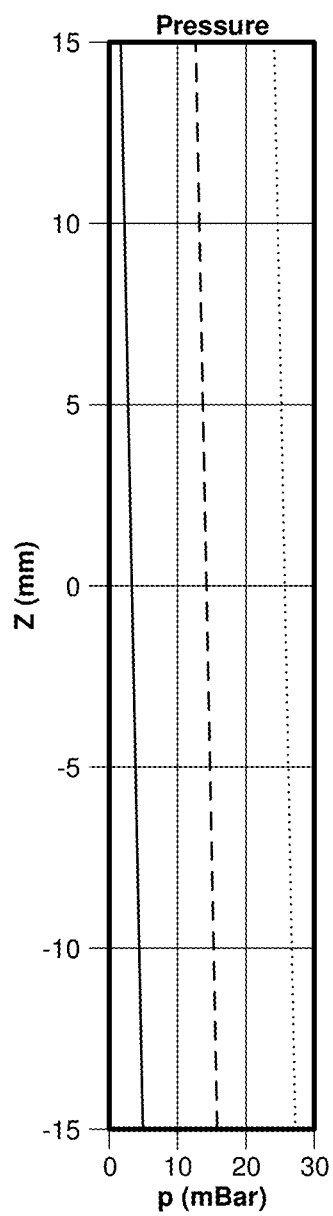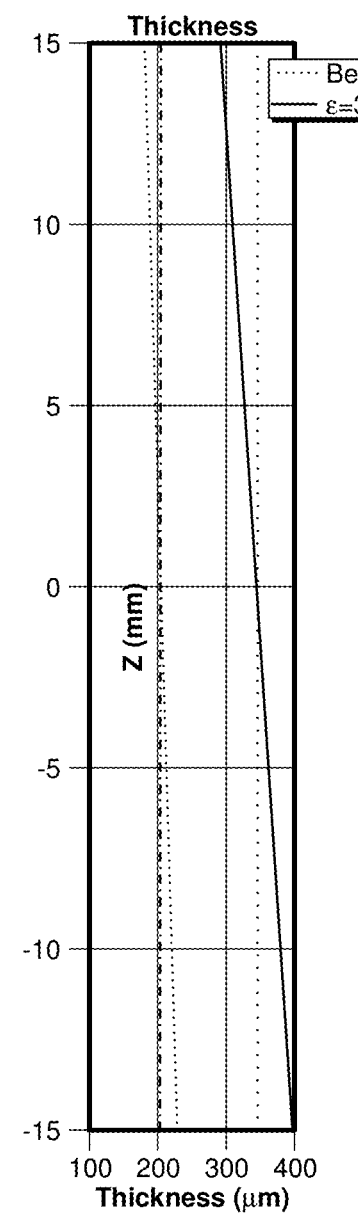
*FIG. 12A*  *FIG. 12B*

$T_0 = T_{00} - az$, $z_1 = z_0(1+\xi)$

Point at $z_0$ moves to $z_1$ on stretching, so thickness after stretching at z is function of pre-stretch thickness at $\frac{z}{1+\xi}$ $$T(z) = \frac{T_0(z/(1+\xi))}{(1+\xi)^2} = \frac{T_{00} - az/(1+\xi)}{(1+\xi)^2}$$

$$F_L(P_0=0,Z) = \frac{F_{L250}\, T_0(Z/(1+\xi))}{T_{ref}} = \frac{F_{L250}}{T_{ref}}(T_{00} - az/(1+\xi))$$

$$A = \frac{pg(n-1)}{2\,\Phi_{ref}} = \frac{a\, F_{L250}}{T_{ref}(1+\xi)} \Rightarrow a = \frac{A.T_{ref}(1+\xi)}{F_{L250}}$$

GRAVITY SAG COMPENSATION IN FLUID-FILLED LENSES

CROSS REFERENCE TO RELATED APPLICATION

This application claims the benefit of U.S. Provisional Application No. 62/849,010, filed May 16, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 9A-9C further illustrate an example membrane processing operation.

FIGS. 12A-12D illustrate pressure, membrane thickness, line tension, and optical power versus height for a fluid lens in different actuation states, according to some embodiments.

Figure 1A:
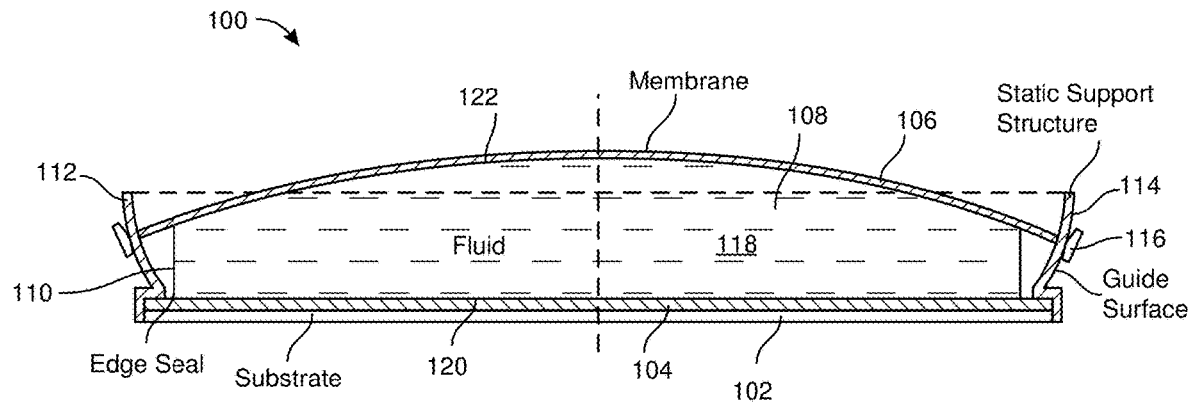
FIGS. 1A-1C illustrate example fluid lenses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings, and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to fluid lenses, such as adjustable fluid lenses. As will be explained in greater detail below, embodiments of the present disclosure may include adjustable liquid lenses, membranes configured for use in fluid lenses, membrane assemblies that may include a peripheral structure (e.g., a guide wire or support ring), and improved devices using fluid lenses, such as ophthalmic devices. Fluid lenses may include lenses having an elastomeric or otherwise deformable element (such as a membrane), a substrate, and a fluid.

Example embodiments described in the present disclosure include apparatuses, systems, and methods related to fluid lenses (such as adjustable fluid-filled lenses), including fluid lenses configured to reduce or effectively eliminate gravity sag.

Figure 22:
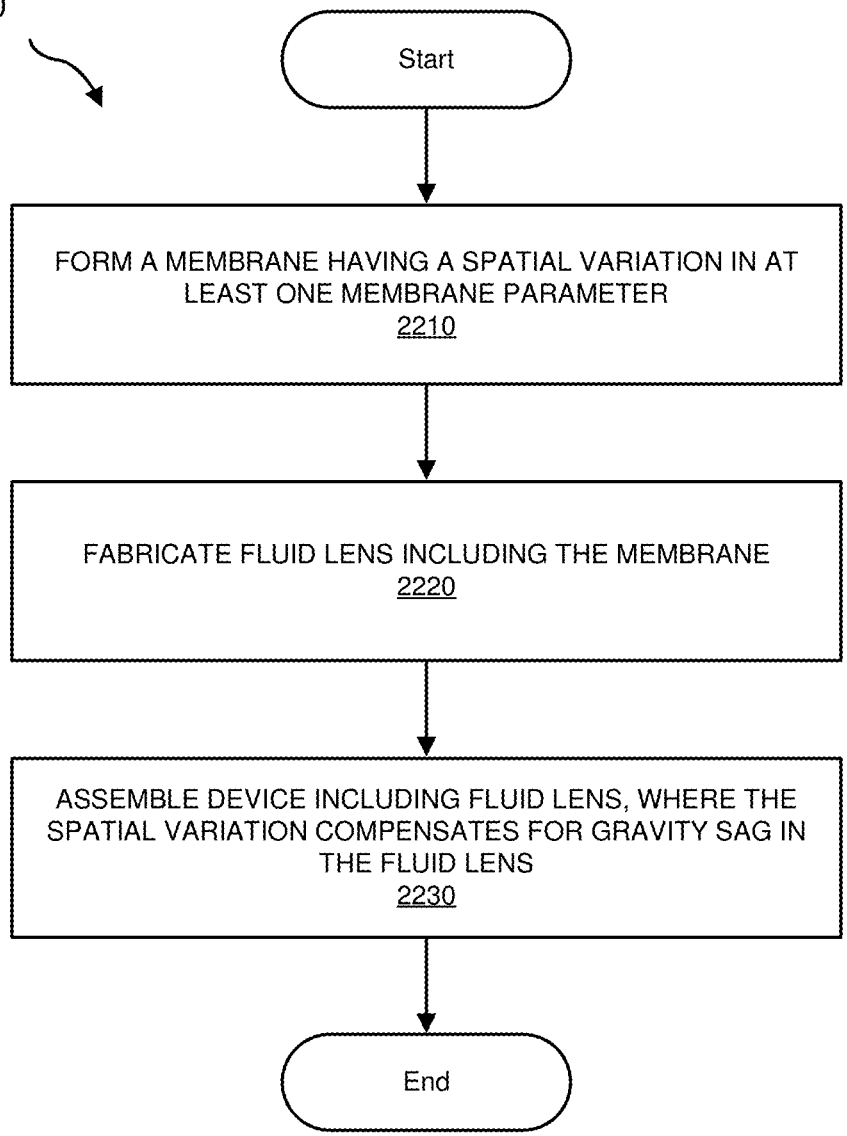
FIGS. 22-23 illustrate example methods.
Figure 23:
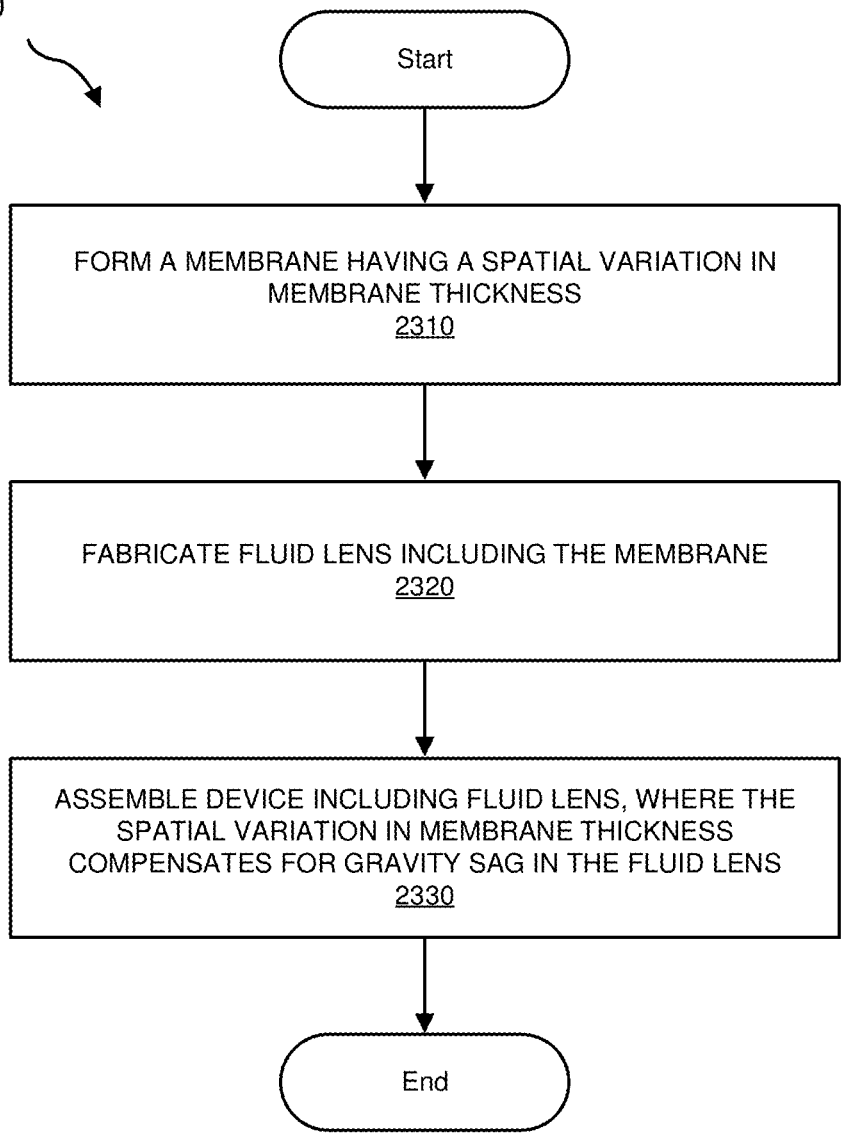
Figure 24:
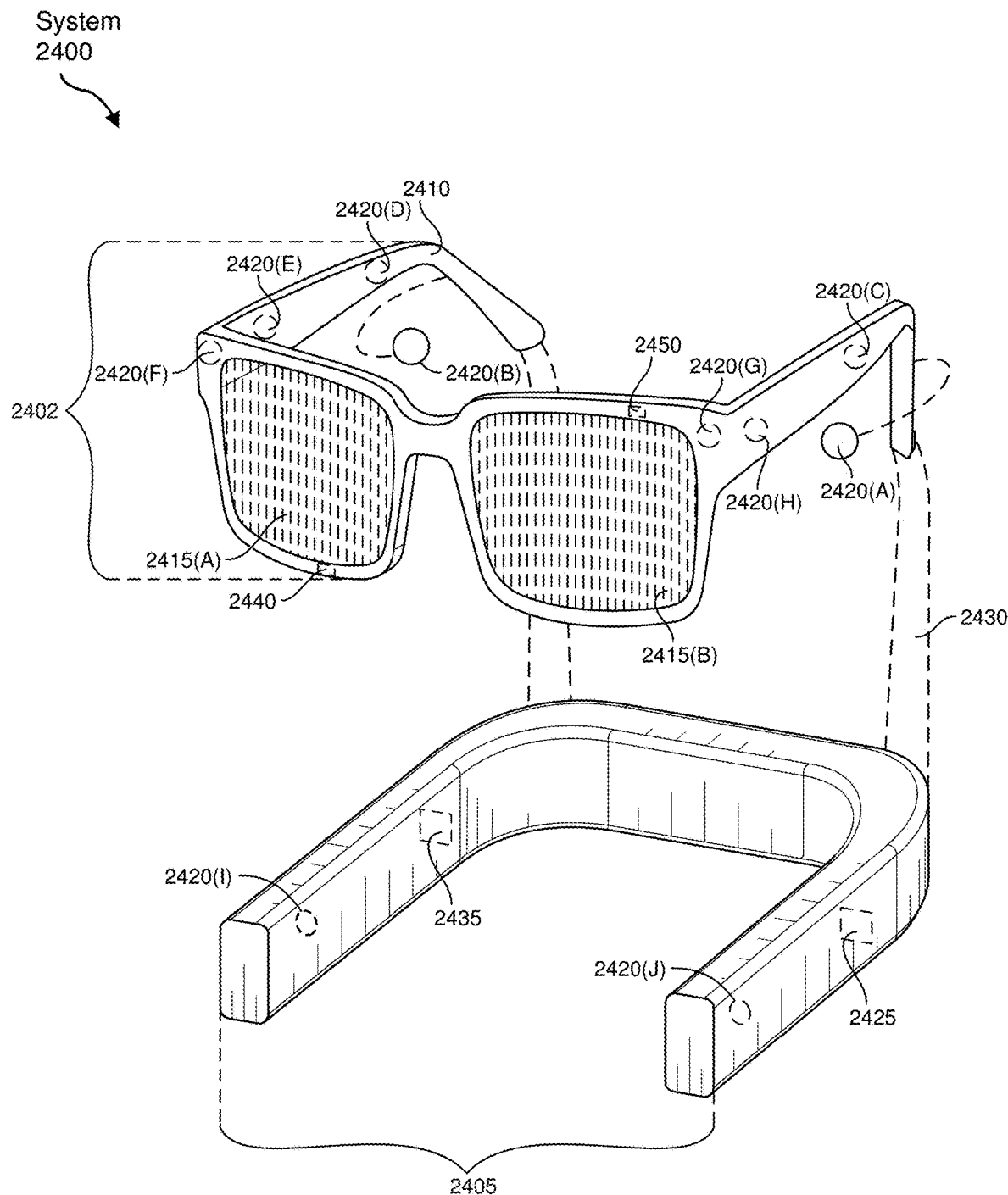
FIG. 24 is an illustration of exemplary augmented-reality glasses that may be used in connection with embodiments of this disclosure.
Figure 25:
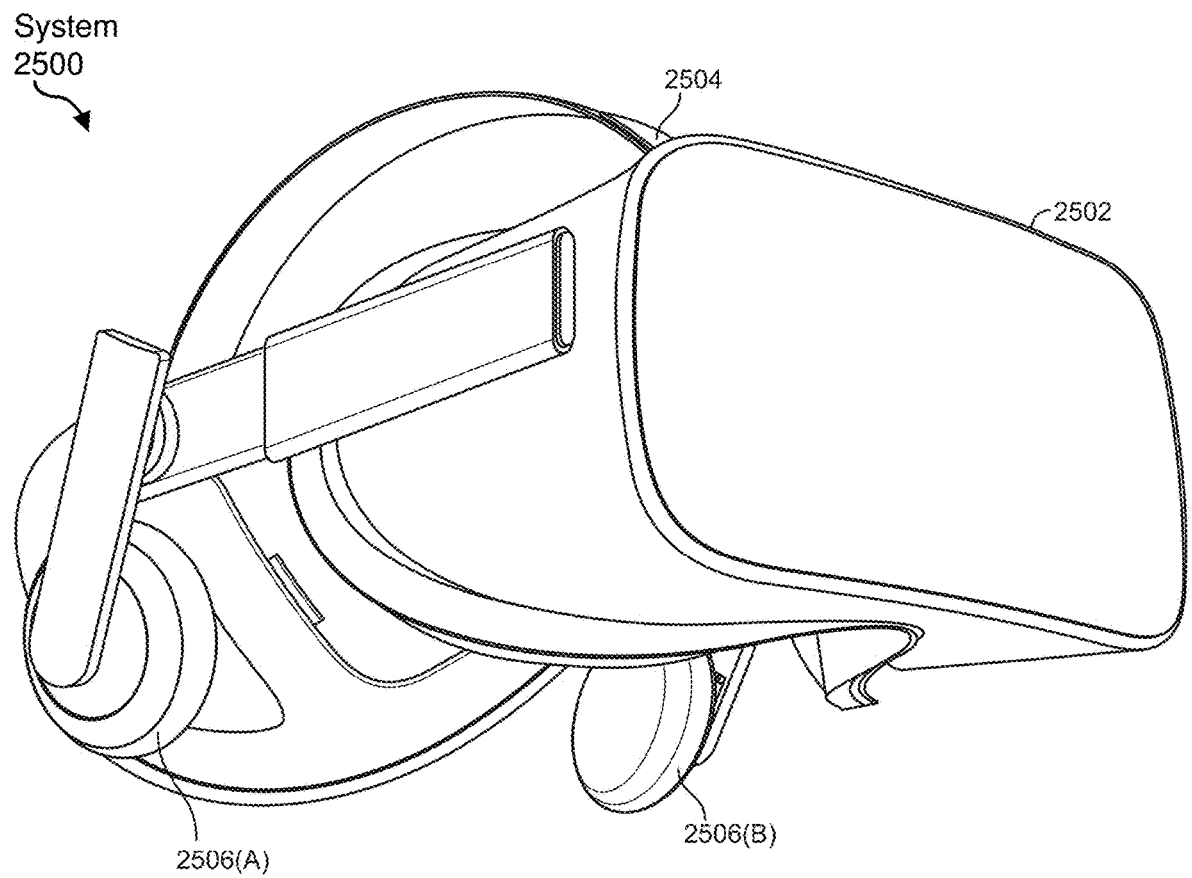
FIG. 25 is an illustration of an exemplary virtual-reality headset that may be used in connection with embodiments of this disclosure.

The following provide, with reference to FIGS. 1-14, detailed descriptions of various examples. FIGS. 1A-5 illustrate example fluid lenses. FIG. 6 illustrates exemplary membrane modification techniques, while FIGS. 7-12 depict the introduction of one or more spatially variable physical properties into a membrane. FIG. 13-17 illustrate how the spatial variation in a physical property may provide a gravity sag correction. FIG. 18 illustrates that a spatial variation in a degree of polymerization or cross-linking may be used to adjust for gravity sag. FIGS. 19-21 illustrate that spatial variations in membrane processing temperature may be used to adjust for gravity sag. FIGS. 22 and 23 describe example methods of correcting for gravity sag. FIGS. 24 and 25 illustrate example augmented reality and virtual reality devices, which may include one or more fluid lenses configured as described herein.

In some examples, an adjustable fluid lens (such as a liquid lens) includes a pre-strained flexible membrane that at least partially encloses a fluid volume, a fluid enclosed within the fluid volume, a flexible edge seal that defines a periphery of the fluid volume, and an actuation system configured to control the edge of the membrane such that the optical power of the lens can be modified. In some examples, movement of an edge portion of the membrane, such as a control point, along a guide path provided by a support structure may result in no appreciable change in the elastic energy of the membrane. The membrane profile may be adjusted by movement of a plurality of control points along respective guide paths, and this may result in no appreciable change in the elastic energy of the membrane. The membrane may be an elastic membrane, and the membrane profile may be a curved profile providing a refractive surface of the fluid lens.

FIG. 1A depicts a cross-section through a fluid lens, according to some embodiments. The fluid lens 100 illustrated in this example includes a substrate 102 (which in this example is a generally rigid, planar substrate), an optional substrate coating 104, a membrane 106, a fluid 108 (that may also be termed a lens fluid, denoted by dashed horizontal lines), an edge seal 110, a support structure 112 providing a guide surface 114, and a membrane attachment 116. In this example, the substrate 102 has a lower (as illustrated) outer surface, and an interior surface on which the substrate coating 104 is supported. The interior surface 120 of the coating 104 is in contact with the fluid 108. The membrane 106 has an upper (as illustrated) outer surface and an interior surface 122 bounding the fluid 108. The membrane may include a polymer additive, as described further below.

The fluid 108 is enclosed within an enclosure 118, which is at least in part defined by the substrate 102 (along with the coating 104), the membrane 106, and the edge seal 110, which here cooperatively define the enclosure 118 in which the fluid 108 is located. The edge seal 110 may extend around the periphery of the enclosure 118, and retain (in cooperation with the substrate and the membrane) the fluid within the enclosed fluid volume of the enclosure 118. In some examples, an enclosure may be referred to a cavity or lens cavity.

In this example, the membrane 106 has a curved profile, so that the enclosure has a greater thickness in the center of the lens than at the periphery of the enclosure (e.g., adjacent the edge seal 110). In some examples, the fluid lens may be a plano-convex lens, with the planar surface being provided by the substrate 102 and the convex surface being provided by the membrane 106. A plano-convex lens may have a thicker layer of lens fluid around the center of the lens. In some examples, the exterior surface of a membrane may provide the convex surface, with the interior surface being substantially adjacent the lens fluid.

The support structure 112 (which in this example may include a guide slot through which the membrane attachment 116 may extend) may extend around the periphery (or within a peripheral region) of the substrate 102, and may attach the membrane to the substrate. The support structure may provide a guide path, in this example a guide surface 114 along which a membrane attachment 116 (e.g., located within an edge portion of the membrane) may slide. The membrane attachment may provide a control point for the membrane, so that the guide path for the membrane attachment may provide a corresponding guide path for a respective control point.

The lens 100 may include one or more actuators (not shown in FIG. 1A) that may be located around the periphery of the lens and may be part of or mechanically coupled to the support structure 112. The actuators may exert a controllable force on the membrane at one or more control points, such as provided by membrane attachment 116, that may be used to adjust the curvature of the membrane surface and hence at least one optical property of the lens, such as focal length, astigmatism correction, surface curvature, cylindricity, or any other controllable optical property. In some examples, the membrane attachment may be attached to an edge portion of the membrane, or to a peripheral structure extending around the periphery of the membrane (such as a peripheral guide wire, or a support ring), and may be used to control the curvature of the membrane.

In some examples, FIG. 1A may represent a cross-section through a circular lens, though examples fluid lenses may also include non-circular lenses, as discussed further below.

Figure 1B:
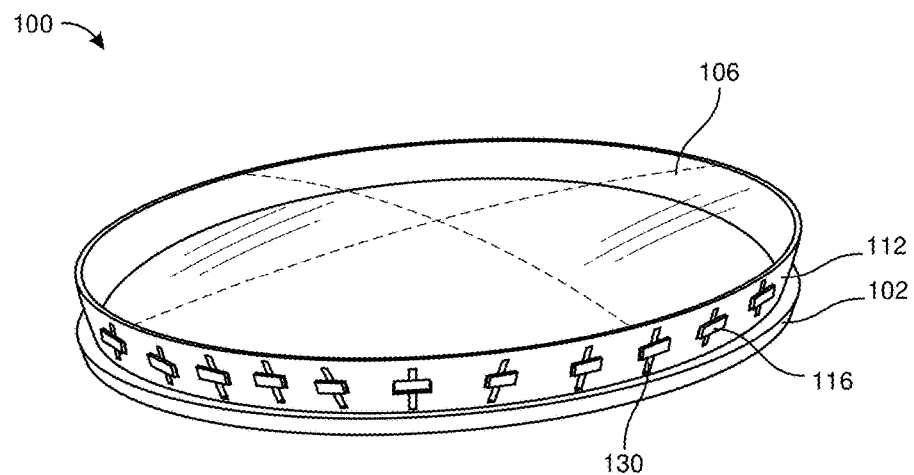

FIG. 1B shows a circular lens, of which FIG. 1A may be a cross-section. The figure shows the lens 100, including the substrate 102, the membrane 106, and the support structure 112. The figure shows the membrane attachment 116 as moveable along a guide path defined by the guide slot 130 and the profile of the guide surface 114 (shown in FIG. 1A). The dashed lines forming a cross are visual guides indicating a general exterior surface profile of the membrane 106. In this example, the membrane profile may correspond to a plano-convex lens.

Figure 1C:
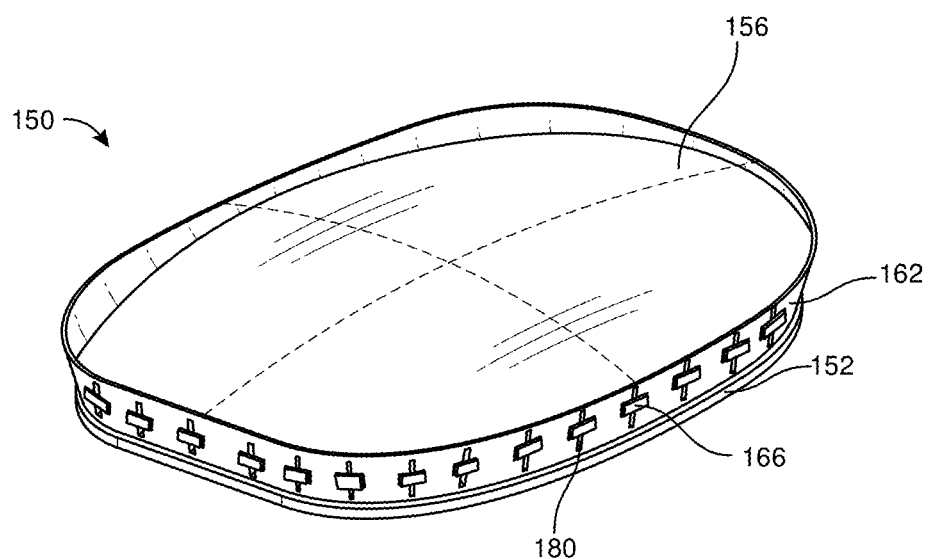

FIG. 1C shows a non-circular lens 150 that may otherwise be similar to the circular lens 100 of FIG. 1B and may have a similar configuration. The non-circular lens 150 includes substrate 152, membrane 156, and support structure 162. The lens has a similar configuration of the membrane attachment 166, movable along a guide path defined by the guide slot 180. The profile of a guide path may be defined by the surface profile of the support structure 162, through which the guide slot is formed. The cross-section of the lens may be analogous to that of FIG. 1A. The dashed lines forming a cross on the membrane 156 are visual guides indicating a general exterior surface profile of the membrane 156. In this example, the membrane profile may correspond to a plano-convex lens.

Figure 2A:
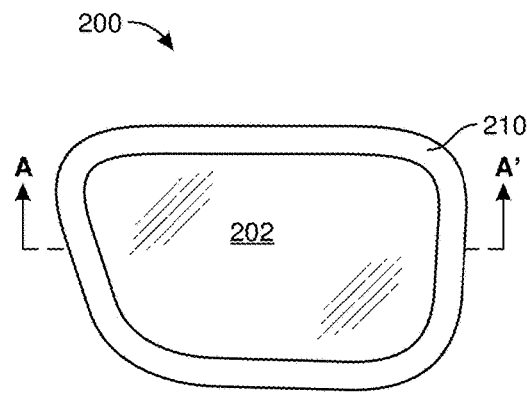
FIGS. 2A-2G illustrate example fluid lenses, and adjustment of the optical power of the fluid lenses, according to some embodiments.

FIGS. 2A-2D illustrate an ophthalmic device 200 including a fluid lens 202, according to some embodiments. FIG. 2A shows a portion of an ophthalmic device 200, which includes a portion of a peripheral structure 210 (that may include a guide wire or a support ring) supporting a fluid lens 202.

In some examples, the lens may be supported by a frame. An ophthalmic device (e.g., spectacles, goggles, eye protectors, visors, and the like) may include a pair of fluid lenses, and the frame may include components configured to support the ophthalmic device on the head of a user, for example, using components that interact with (e.g., rest on) the nose and/or ears of the user.

Figure 2B:
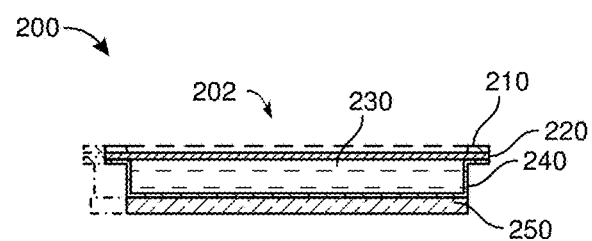

FIG. 2B shows a cross-section through the device 200, along A-A' as shown in FIG. 2A. The figure shows the peripheral structure 210 and the fluid lens 202. The fluid lens 202 includes a membrane 220, lens fluid 230, an edge seal 240, and a substrate 250. In this example, the substrate 250 includes a generally planar, rigid layer. The figure shows that the fluid lens may have a planar-planar configuration, which in some examples may be adjusted to a plano-concave and/or plano-convex lens configuration.

In some examples disclosed herein, one or both surfaces of the substrate may include a concave or convex surface, and in some examples the substrate may have a non-spherical surface such as a toroidal or freeform optical progressive or digressive surface. In various examples, the substrate may include a plano-concave, plano-convex, biconcave, or biconvex lens, or any other suitable optical element.

Figure 2C:
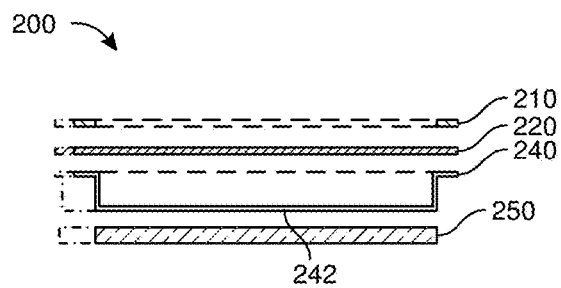

FIG. 2C shows an exploded schematic of the device shown in FIG. 2B, in which corresponding elements have the same numbering as discussed above in relation to FIG.

2A. In this example, the edge seal is joined with an optional central seal portion 242 extending over the substrate 250.

In some examples, the central seal portion 242 and the edge seal 240 may be a unitary element. In other examples, the edge seal may be a separate element, and the central seal portion 242 may be omitted or replaced by a coating formed on the substrate. In some examples, a coating may be deposited on the interior surface of the seal portion and/or edge seal. In some examples, the lens fluid may be enclosed in a flexible enclosure (sometimes referred to as a bag) that may include an edge seal, a membrane, and a central seal portion. In some examples, the central seal portion may be adhered to a rigid substrate component and may be considered as part of the substrate.

Figure 2D:
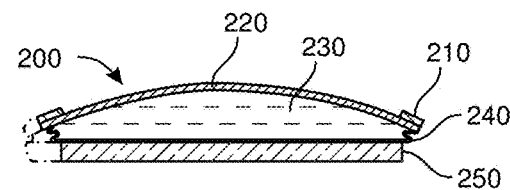

FIG. 2D shows adjustment of the device configuration, for example, by adjustment of forces on the membrane using actuators (not shown). As shown, the device may be configured in a planar-convex fluid lens configuration. In an example plano-convex lens configuration, the membrane 220 tends to extend away from the substrate 250 in a central portion.

In some examples, the lens may also be configured in a planar-concave configuration, in which the membrane tends to curve inwardly towards the substrate in a central portion.

Figure 2E:
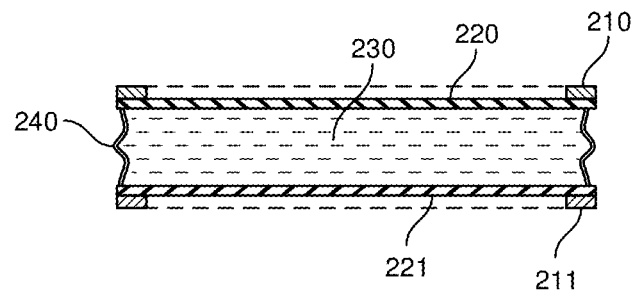

FIG. 2E illustrates a similar device to FIG. 2B, and element numbering is similar. However, in this example, the substrate 250 of the example of FIG. 2B is replaced by a second membrane 221, and there is a second peripheral structure (such as a second support ring) 211. In some examples, the membrane 220 and/or the second membrane 221 may be integrated with the edge seal 240.

Figure 2F:
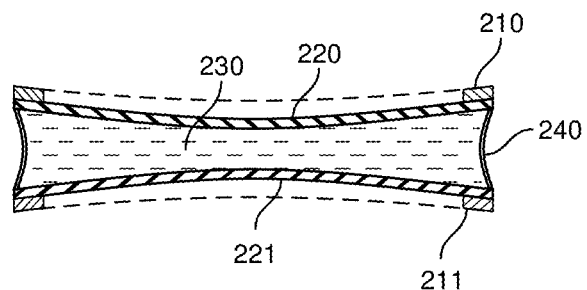

FIG. 2F shows the dual membrane fluid lens of FIG. 2E in a biconcave configuration. For example, application of negative pressure to the lens fluid 230 may be used to induce the biconcave configuration. In some examples, the membrane 220 and second membrane 221 may have similar properties, and the lens configuration may be generally symmetrical, for example, with the membrane and second membrane having similar radii of curvature (e.g., as a symmetric biconvex or biconcave lens). In some examples, the lens may have rotational symmetry about the optical axis of the lens, at least within a central portion of the membrane, or within a circular lens. In some examples, the properties of the two membranes may differ (e.g., in one or more of thickness, composition, membrane tension, or in any other relevant membrane parameter), and/or the radii of curvature may differ.

Figure 2G:
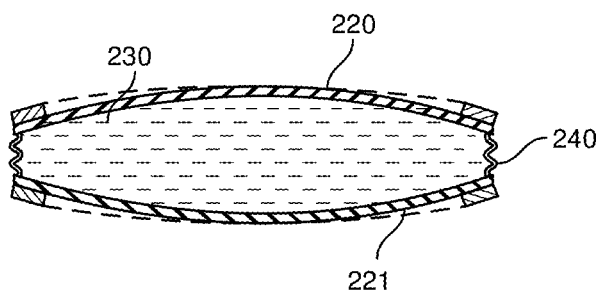

FIG. 2G shows the dual membrane fluid lens of FIG. 2E in a biconvex configuration, with corresponding element numbers In some examples, an ophthalmic device, such as an eyewear device, includes one or more fluid lenses. An example device includes at least one fluid lens supported by eyeglass frames. In some examples, an ophthalmic device may include an eyeglass frame, goggles, or any other frame or head-mounted structure to support one or more fluid lenses, such as a pair of fluid lenses.

Figure 3:
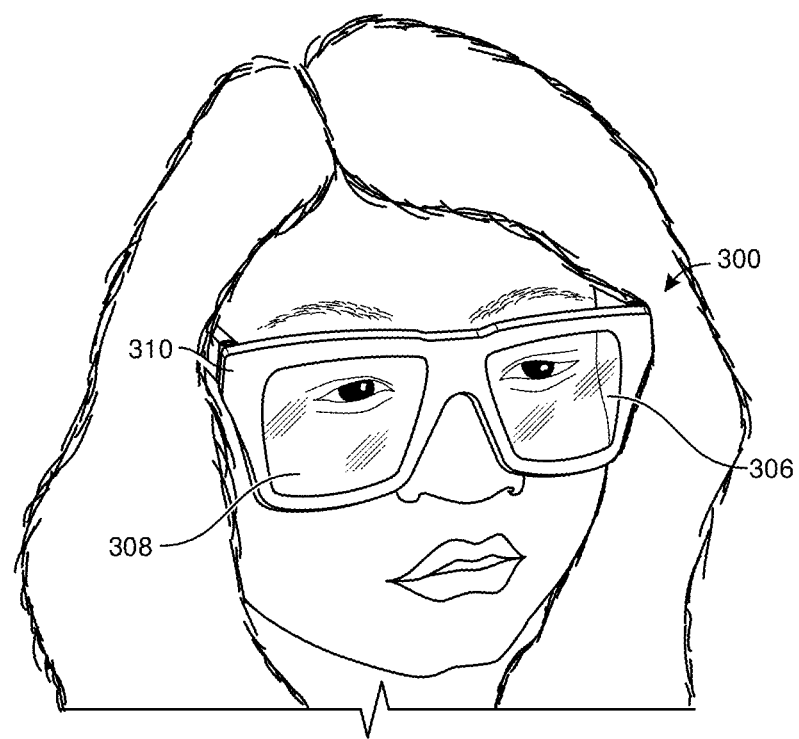
FIG. 3 illustrates an example ophthalmic device.

FIG. 3 illustrates an ophthalmic device including a pair of fluid lenses, according to some embodiments. The example eyewear device 300 may include a pair of fluid lenses, 306 and 308, supported by an eyeglass frame 310 (that may also be referred to as a "frame" for conciseness). The pair of fluid lenses 306 and 308 may be referred to as left and right lenses, respectively (from the viewpoint of the user).

In some examples, an eyewear device (such as eyewear device 300 in FIG. 3) may include a pair of eyeglasses, a pair of smart glasses, an augmented reality device, a virtual reality headset, or the like.

In some examples, the frame 310 may include one or more of any of the following: a battery, a power supply or power supply connection, other refractive lenses (including additional fluid lenses), diffractive elements, displays, eye-tracking components and systems, motion tracking devices, gyroscopes, computing elements, health monitoring devices, cameras, and/or audio recording and/or playback devices (such as microphones and speakers).

Figure 4A:
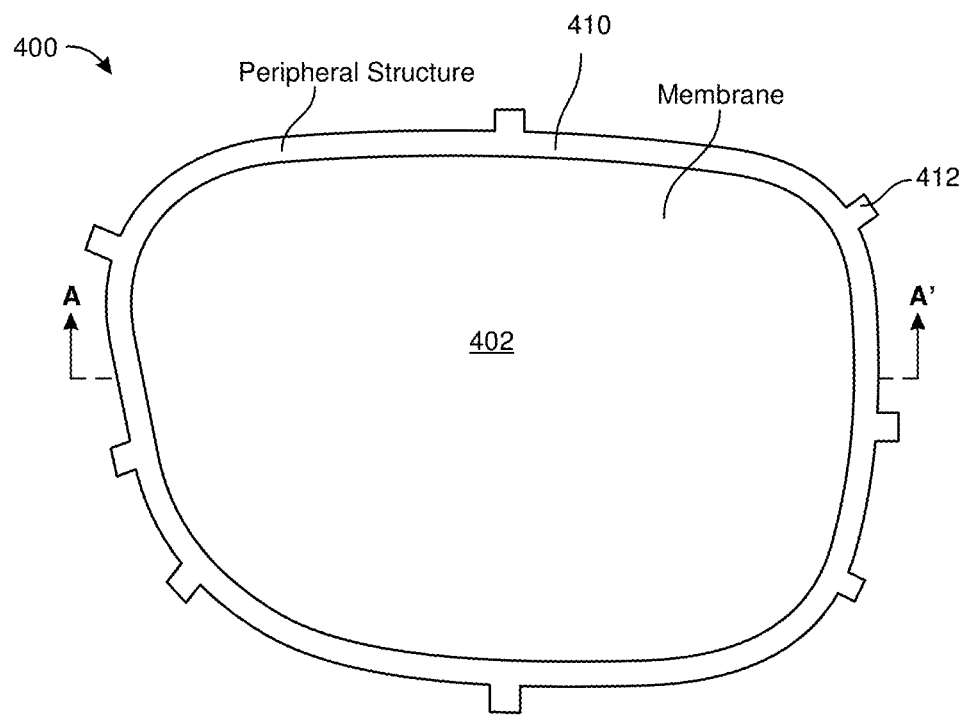
FIGS. 4A-4B illustrate a fluid lens having a membrane assembly including a peripheral structure.

FIG. 4A shows an example fluid lens 400 including a peripheral structure 410 that may generally surround a fluid lens 402. The peripheral structure 410 (in this example, a support ring) includes membrane attachments 412 that may correspond to the locations of control points for the membrane of the fluid lens 402. A membrane attachment may be an actuation point, where the lens may be actuated by displacement (e.g., by an actuator acting along the z-axis) or moved around a hinge point (e.g., where the position of the membrane attachment may be an approximately fixed distance "z" from the substrate). In some examples, the peripheral structure and hence the boundary of the membrane may flex freely between neighboring control points. Hinge points may be used in some embodiments to prevent bending of the peripheral structure (e.g., a support ring) into energetically favorable, but undesirable, shapes.

A rigid peripheral structure, such as a rigid support ring, may limit adjustment of the control points of the membrane. In some examples, such as a non-circular lens, a deformable or flexible peripheral structure, such as a guide wire or a flexible support ring, may be used.

Figure 4B:
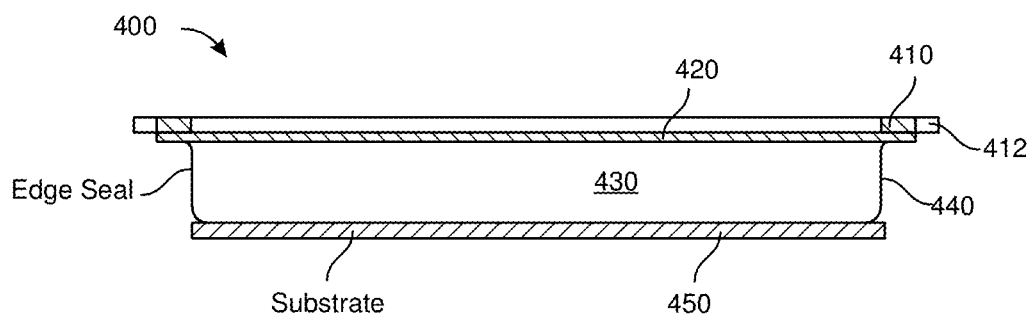

FIG. 4B shows a cross-section of the example fluid lens 400 (e.g., along A-A' as denoted in FIG. 4A). The fluid lens includes a membrane 420, fluid 430, edge seal 440, and substrate 450. In some examples, the peripheral structure 410 may surround and be attached to the membrane 420 of the fluid lens 402. The peripheral structure may include membrane attachments 412 that may provide the control points for the membrane. The position of the membrane attachments (e.g., relative to a frame, substrate, or each other) may be adjusted using one or more actuators, and used to adjust, for example, the optical power of the lens. A membrane attachment having a position adjusted by an actuator may also be referred to as an actuation point, or a control point.

In some examples, an actuator 460 may be attached to actuator support 462, and the actuator be used to vary the distance between the membrane attachment and the substrate, for example, by urging the membrane attachment along an associated guide path. In some examples, the actuator may be located on the opposite side of the membrane attachment from the substrate.

In some examples, one or more actuators may be attached to respective actuator supports. In some examples, an actuator support may be attached to one or more actuators. For example, an actuator support may include an arcuate, circular, or other shaped member along which actuators are located at intervals. Actuator supports may be attached to the substrate, or, in some examples, to another device component such as a frame. In some examples, the actuator may be located between the membrane attachment and the substrate, or may be located at another suitable location. In some examples, the force exerted by the actuator may be generally directed along a direction normal to the substrate, or along another direction, such as along a direction at a non-normal direction relative to the substrate. In some examples, at least a component of the force may be generally parallel to the substrate. The path of the membrane attachment may be based on the guide path. In some examples the force applied by the actuator may have at least an appreciable component directed along the guide path, and may be approximately parallel to the guide path.

Figure 5:
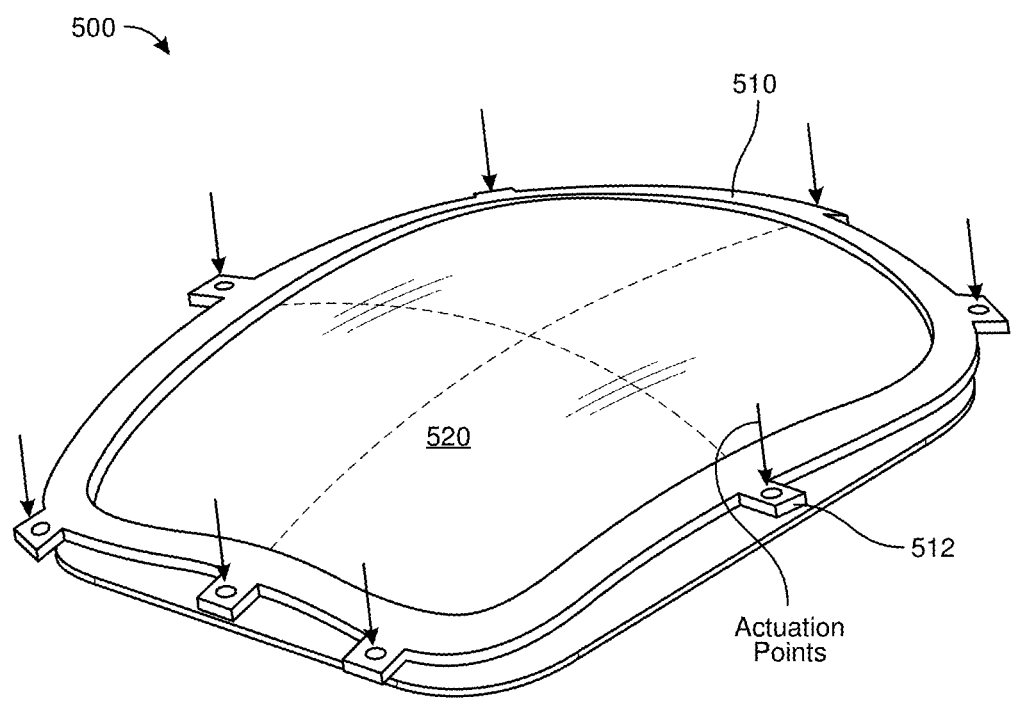
FIG. 5 illustrates deformation of a non-circular fluid lens.

FIG. 5 shows an example fluid lens 500 including a peripheral structure 510, here in the form of the support ring including a plurality of membrane attachments 512, and extending around the periphery of a membrane 520. The membrane attachments may include or interact with one or more support structures that each provide a guide path for an associated control point of the membrane 520. Actuation of the fluid lens may adjust the location of one or more control points of the membrane, for example, along the guide paths provided by the support structures. Actuation may be applied at discrete points on the peripheral structure, for example, the membrane attachments shown. In some examples, the peripheral structure may be flexible, for example, so that the peripheral structure may not be constrained to lie within a single plane.

Embodiments of the present disclosure may include fluid lenses (such as adjustable fluid lenses), membranes used in fluid lenses, and improved devices using fluid lenses. Examples also include methods of modifying one or more properties of the membrane, such as modifying the elastic properties, or reducing the fluid permeability of membranes.

Fluid lenses, which may also be termed fluid-filled lenses (including liquid-filled lenses), may include lenses having an elastomeric or otherwise deformable element (such as a membrane), a substrate, and a fluid.

In some examples, a membrane may include a thermoplastic polyurethane (TPU). The membrane may include one or more elastomers, and the membrane may be an elastomeric membrane. A thermoplastic polyurethane (TPU) thin-film membrane may be used in a fluid lens, for example, a fluid lens including an optical oil. Example fluid lenses include adjustable ophthalmic lenses. In a conventional fluid lens, the lens fluid, such as an optical oil, may penetrate and move across the membrane, causing the membrane to become cloudy and unusable for visual purposes. Furthermore, the membrane, such as a TPU membrane, may swell and lose tension.

Examples of the present disclosure include fluid lenses having a membrane with reduced, substantially eliminated, or spatially varying penetration of the membrane by the lens fluid. Penetration of the membrane by the fluid may modify the properties of the membrane. For example, the transparency of the membrane may be reduced, or an elastic constant of the membrane may change over time. These effects, and others, may reduce the performance stability and reproducibility of a fluid lens over time. For example, the mechanical force applied to the membrane to achieve a desired optical state of the fluid lens may change over time due to fluid penetration into the membrane. This is undesirable, as it may require repeated calibration, fluid lens replacement, and/or actuator adjustment.

In some approaches, the manufacturing and processing of TPU films may introduce a processing wax into the polymer film. The extrusion and calendering processes used to produce TPU membranes may introduce the wax as a component of the membrane. The processing wax does not typically have a negative impact on the initial optical properties of the membrane, so there may be no initially apparent reason to remove the processing wax. However, the processing wax may have a long-term negative impact on the membrane optical properties, and possibly a negative impact on fluid lens optical performance, when the membrane is used in a fluid lens. In such applications, the membrane may be, for example, in contact with a lens fluid such as an optical oil, such as a silicone oil, over a long time period during the lifetime of a fluid lens. In a conventional fluid lens, problems may arise due to the penetration of the membrane by the lens fluid.

In some examples, a fluid lens may include a substrate, a fluid, and a membrane, such as a thermoplastic polyurethane (TPU) membrane. The fluid may include a phenylated siloxane, such as pentaphenyl trimethyl trisiloxane, that may sometimes be referred to as an example of a silicone oil. As supplied, a TPU membrane (or a TPU film from which the membrane is prepared) may include a processing material, such as a processing wax. If such a membrane is used in a fluid lens, the processing material may exude from the membrane over time, that may lead to undesirable device performance variations. Also, the processing material may promote fluid infusion into the membrane, that may cause undesirable variations in membrane properties and device performance.

The processing material may facilitate diffusion of the lens fluid (e.g., a component of the lens fluid) into the membrane. The processing material may also present ageing problems, such as yellowing over time. The membrane may be improved (e.g., the rate of diffusion of the lens fluid into the membrane may be reduced) by removing the processing material from the membrane. The processing material may be removed from the membrane, for example, using a solvent.

The rate of diffusion of the lens fluid into the membrane may be reduced by introducing an additive to the membrane, for example, an additive that may occupy voids left within the membrane by removal of the processing material. The additive may be a polymer additive, and may be introduced to the membrane by allowing a polymerizable material (such as a monomer) to infuse into the membrane, after removal of the processing material from the membrane, followed by polymerization the polymerizable material to form the polymer additive. The additive, such as a polymer additive, may reduce the diffusion rate of the lens fluid into the lens membrane by physically occupying voids in the membrane left by removal of the processing material. In some examples, the polymer additive may have a property, such as a surface energy, that may tend to repel the lens fluid. In some examples, the additive may reduce ageing of the membrane by helping to exclude contaminants from entering the membrane. Contaminants may include the lens fluid, and may include contaminants from external sources, such as oils (e.g., skin oil, or cooking oil).

A membrane, such as an elastomeric membrane, with improved mechanical and/or chemical stability may be obtained by reducing or substantially preventing fluid infusion into the membrane. In some example approaches, a processing material such as a wax may be removed from the membrane, for example, using a solvent such as methanol. After wax removal, free volume within the membrane may be at least partially filled with an additive, such as a polymer, such as a cross-linked polymer. In some examples, the degree of polymerization (e.g., average molecular weight) and/or degree of polymerization may exhibit a spatial variation, that may induce a variation in a membrane parameter, such as an elastic constant, such as an elastic modulus, such as Young's modulus.

In some examples, a modification of the membrane of a fluid lens may also reduce fluid penetration into the membrane. In some examples, a thermoplastic polyurethane (TPU) membrane may be modified to reduce or substantially prevent lens fluid penetration, such as oil penetration, using a process that also allows introduction of a spatial variation in one or more membrane parameters. Example processes and materials may modify the membrane (such as a TPU membrane) to reduce or substantially prevent penetration of the membrane by the lens fluid (such as an oil). This may enable the membrane to remain clear throughout the product lifetime of a fluid lens. This may be highly desirable in some applications, such as ophthalmic applications.

In some examples, a membrane may be initially modified by removing any processing materials added to facilitate membrane processing. For example, a thermoplastic polyurethane (TPU) membrane may include a processing wax as a processing material. However, the processing material may be hydrophobic, and may encourage diffusion of hydrophobic oils into the membrane. The processing material, such as a wax, may be removed using a solvent, such as an alcohol (e.g., methanol, ethanol, propanol, or other alcohol).

In some examples, a membrane may be modified by including an additive into the free volume within the polymer. The additive may fill any voids left by removal of any processing materials, such as a processing wax, and may otherwise fill or reduce the free volume within the membrane. Example additives may include one or more polymerizable materials, such as a polymerizable monomer introduced to the membrane. A monomer additive may be polymerized in situ after introduction to the membrane, to provide a polymer additive that reduces or substantially prevents fluid penetration into the membrane, and spatial variations in the properties of the polymer additive (e.g., compositional variations such as number of repeat units, degree of polymerization, or chemical composition) may be used to introduce spatial variation in one or more membrane parameters.

In some examples, a thermoplastic polyurethane thin film membrane may be modified by removing the processing wax from the membrane (or, e.g., from a membrane polymer used to form the membrane), and then introducing one or more materials (e.g., one or more additive precursors), such as one or more UV-curable acrylates, to the membrane (or, e.g., into the material used to form the membrane). The additive precursor, such as a UV-curable acrylate material (that may include one or more acrylate species, such as monomer acrylate species, or other material) may then be polymerized to provide a polymer additive to the membrane that may help prevent or appreciably slow, for example, oil or other lens fluid penetration into the membrane. The polymer material may form a coating on the membrane, a surface region, and/or may be introduced through the membrane material.

For example, a fluoroacrylate (such as perfluoroheptylacrylate) and an initiator (e.g., phenyl bis(2,4,6-trimethylbenzoyl) phosphine oxide) may be infused into the membrane. The fluoroacrylate may then be cross-linked (e.g., using UV) within the membrane, forming a fluoroacrylate polymer, that may reduce or effectively eliminate fluid diffusion into the membrane.

In some examples, a membrane may be modified to reduce or substantially prevent contaminant ingress. In some examples, a membrane may include a membrane polymer, such as a thermoplastic polyurethane (TPU), that may include a thermoplastic elastomer with linear block copolymers including both relatively rigid and relatively flexible segments. A membrane may include a free volume, such as the volume inherently present within a membrane material, for example, created by gaps between entangled polymer chains. A membrane material may include a membrane polymer, such as a urethane polymer. The free volume may also result from removal of processing material, such as a processing wax. A polymerizable material may be introduced into the free volume and polymerized to form a polymer additive, that may form a polymer network extending through the membrane.

Examples also include material preparations and modifications that may help reduce, and in some cases substantially prevent, penetration of a lens membrane by a lens fluid. Examples include improved fluid lenses having fluid-impermeable membranes. In some examples, an improved fluid lens includes a membrane including a TPU, a substrate, and a lens fluid, where the membrane is effectively impervious to the lens fluid.

In some examples, a fluid lens (which, as detailed above, may also be termed a "fluid-filled lens" or a "liquid-filled lens") includes a substrate and a membrane, at least partially enclosing the fluid. The fluid within a fluid lens may also be referred to as a "lens fluid." The fluid may include an oil, such as a silicone oil. The membrane may be connected to the substrate around the periphery of the membrane, for example, using a connection assembly. The connection assembly may include one or more of an actuator, a post, a wire, or other connection hardware. In some examples, one or more actuators may be used to adjust the location of control points arranged within a peripheral region of the membrane, that may adjust the curvature of the membrane, and hence the optical properties of the fluid lens. An edge seal may also be provided around the periphery of the lens. In some examples, the connection assembly may provide an edge seal. In some examples, the edge seal may include a flexible polymer layer. In some examples, the edge seal may be located within the connection assembly. In some examples, a separate edge seal may not be present, and the fluid may be sealed by a connection between the substrate and the membrane. A substrate may include a peripheral protruding portion that provides the function of an edge seal. Adjustment of the curvature of the fluid membrane may be accomplished by moving the membrane boundary towards or away from the substrate (that may occasionally be termed "axial adjustment"), which changes the curvature of the membrane as a result of fluid volume conservation (as in some examples, a fluid, such as a liquid, may be assumed to be incompressible). This may cause a slight change in tension within the membrane, for example, a slight increase in tension as the membrane boundary is moved towards the substrate. In some examples, the radial distance of the membrane boundary from the optical center of the lens may also be adjusted, either as an alternative or in combination with the axial adjustment. The membrane boundary may be adjusted by moving one or more control points located around the membrane boundary, for example, using one or more actuators to move control points located around the membrane boundary, or otherwise within a peripheral region of the membrane.

Figure 6A:
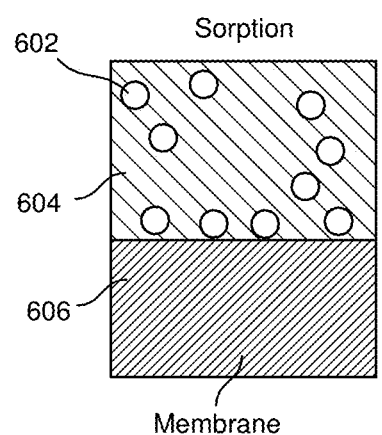
FIGS. 6A-6C illustrate infusion of a polymerizable material into a membrane.
Figure 6B:
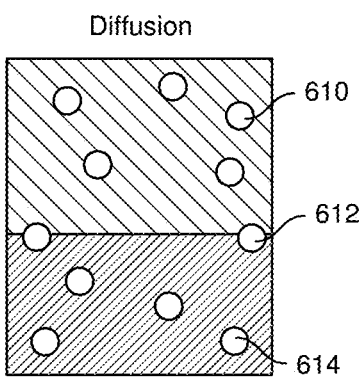
Figure 6C:
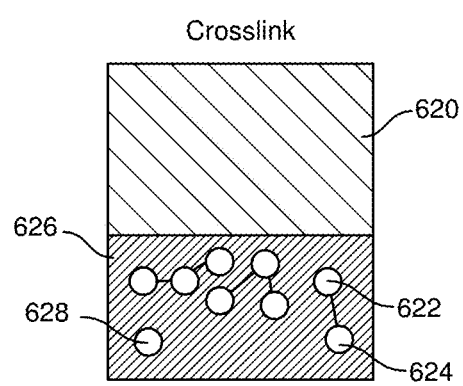

FIGS. 6A-6C illustrate an example approach to fabricating an improved membrane, showing changes that may take place over time. FIG. 6A shows, generally at 600, a portion of a membrane 606 in contact with an fluid mixture 604. The fluid mixture 604 may be in contact with the membrane 606, and may include a polymerizable material 602. Absorption of the polymerizable material 602 into the membrane may start to occur. The polymerizable material 602 is symbolically represented by circles, for illustrative convenience. FIG. 6B shows infusion of the polymerizable material into the membrane. The figure schematically illustrates that some polymerizable material 610 may remain in the fluid mixture, some polymerizable material 612 may pass into the membrane through the interface between the fluid mixture, and some polymerizable material 614 may diffuse further into the membrane. FIG. 6C shows polymerization of the polymerizable material to form a polymer additive, such as a network polymer, that may extend through the membrane. A polymerizable material may also be referred to as an additive precursor. The remaining fluid mixture after infusion of the polymerizable material (620) may be removed before the polymerization occurs. The modified membrane 626 may include an additive polymer 622, formed by polymerization of polymerizable material 624. A polymer additive may form a polymer network, which may or may not form a continuous network through the membrane polymer. There may be unpolymerized polymerizable material 628 which, in some examples, may react with any suitable unpolymerized groups within the membrane polymer. In some examples, the additive polymer may be further cross-linked.

A surface of a membrane material (e.g., a membrane polymer that may be used to form the membrane of a fluid lens) may be exposed to the fluid mixture, for example, during fabrication of the membrane, or later, for example, as a component, or during or after fabrication of the fluid lens. In some examples, the fluid mixture may include a polymerizable material within a solvent or other fluid. In some examples, a liquid polymerizable material may be used, possibly in place of a fluid mixture. The polymerizable material may then diffuse into the membrane material. The polymerizable material may then be polymerized, for example, using UV radiation, thermal treatment, ultrasound radiation, or other process, to form a polymer additive. The fluid mixture may include a polymerization initiator (sometime referred to as an initiator for conciseness), that may also diffuse into the membrane material. The polymerizable material may be polymerized to form a polymer additive, that may form a polymer network extending through at least a portion of the membrane material, and may optionally be cross-linked. In some examples, the polymerizable material may include one or more multifunctional monomer species that may form a cross-linked polymer network on polymerization. In some examples, a polymer may be cross-linked after an initial polymerization, using any appropriate method. In some examples, there may be a concentration gradient of the additive polymer within the membrane with a higher concentration proximate a treated surface of the membrane. One or both surfaces of a membrane may be treated in this or a similar manner.

The physical properties of the membrane may depend on parameters such as the amount of concentration of the additive polymer within the membrane, the degree of polymerization of the polymerizable material, or on the degree of cross-linking (if any) of the additive polymer. By introducing a spatial variation into one or more of these parameters, a spatial variation in one or more physical properties of the membrane may be obtained. In some examples, a spatial variation in a physical property, such as an elastic constant, may be used to compensate for gravity sag in a fluid lens. In some examples, a concentration gradient may be obtained parallel to the plane of a surface of the membrane. A spatial variation in an elastic constant may include a spatial variation in an elastic modulus (such as the Young's modulus associated with a particular elastic deformation).

In some examples, a fluid lens includes a substrate and a flexible membrane enclosing a fluid (such as a liquid). If the physical properties and the tension of the membrane are spatially uniform, the lower portion of the membrane may tend to bulge out more, from the greater hydrostatic pressure of the fluid in the lower portion of the lens, due to gravity. The hydrostatic pressure in the lens fluid tends to increase, going from the top of the lens to the bottom of the lens. This "gravity sag" effect may be greater for low membrane tensions. A typical gravity sag may represent a 0.25 diopter change in optical power using a 200 N/m membrane tension.

Example approaches to reducing gravity sag include varying one or more membrane parameters as a function of position, such as the membrane thickness, membrane processing temperature, membrane tension, degree of cross-linking (e.g., by ink-jet printing a variable concentration or amount of cross-linkable agents), chemical composition, and the like. In particular, gravity sag may be reduced using a membrane that is thicker and/or under more tension within the lower portion. Similar approaches may also be used to fabricate aspheric lenses, for example, by having a higher tension in a lower portion, or a different tension in the lens center. In some examples, the degree of cross-linking may be spatially varied. Applications include optics, and other applications of fluid lenses.

In some examples, a surface layer thickness and/or one or more membrane parameters (e.g., polymer parameters) may be varied to provide a spatial variation of mechanical properties, that may be used to fabricate lenses such as aspheric fluid lenses and/or fluid lenses having gravity sag compensation. Polymer parameters may include one or more of degree of polymerization, degree of cross-linking, polymer processing temperature, or composition of the polymerization mixture (e.g., monomer component fractions or proportion of initiator may be spatially varied). Other membrane parameters may include one or more of membrane thickness, membrane composition, membrane coating thickness, membrane additive proportion, membrane elastic constant, etc. In some example, a membrane parameter may vary as a monotonic, or in some examples, an approximately linear manner, in a particular direction. The particular direction of variation may be generally over the lens, and may be generally parallel to a diameter through a center of the lens. In some examples, the membrane surface energy may be modified by polymerizable material infusion and/or a surface layer, for example, to prevent wetting by the fluid.

In some examples, an adjustable fluid-filled lens (such as a fluid lens) includes a pre-strained flexible membrane which at least partially encloses a fluid volume, a fluid enclosed within the fluid volume, a flexible edge seal which defines a periphery of the fluid volume, and an actuation system configured to control the edge of the membrane such that the optical power of the lens can be modified.

In a fluid lens including a membrane, the hydrostatic pressure of the fluid may vary as a function of height. In this context, the term height is related to the orientation of the lens and gravity, as the fluid in the lower portion of the fluid volume may exert an increased hydrostatic pressure due to the weight of the fluid above the lower portion. Hence, the membrane may tend to bulge out more in the lower half of the lens, as compared to the upper half. In this context, the terms "upper" and "lower" relate to the orientation of the device in the local gravitational field. Hence, the lens properties may vary as a function of height. This effect may be termed gravity sag.

Gravity sag may include an undesirable variation of the optical power of a fluid lens with height, due to the hydrostatic pressure gradient in a fluid-filled lens. Gravity sag may be expressed as change in optical power with height, such as 0.25D in 20 mm. In applications such as ophthalmic devices (such as spectacles), or other head-mounted devices (such as augmented reality devices or virtual reality devices), the lenses typically have a generally vertical orientation when the device is worn by a user (e.g., in a conventional sitting or standing position), having a lower portion closer to the ground than the upper portion.

In some examples, a device according to the present disclosure, such as a fluid lens, includes a stretched elastic membrane having a line tension that varies with height in order to counteract undesired optical effects due to the hydrostatic pressure variation in the fluid. The membrane may be configured so that the variations in line tension in the membrane counteract gravity sag. In some examples, between 20 and 100% of the gravity sag may be counteracted. In other examples, between 50 and 80% of the gravity sag may be compensated.

An example method of designing a fluid lens including a membrane may include one or more of the following steps: calculating gravity sag based on, for example, lens height and fluid density (this may assume a generally vertical alignment of the lens); calculating a line tension profile for the membrane that counteracts the gravity sag; and configuring the membrane to counteract the gravity sag. Configuring the membrane may include conditioning the membrane with a coating or treatment.

Line tension may refer to the tensile force per unit length of a distensible membrane, expressed in units of N/m. A membrane may include a thin sheet or film (e.g., having a membrane thickness that may be one or more orders of magnitude less than another film dimension, such as width). A membrane may form the deformable optical surface of an adjustable fluid-filled lens Examples described in the present disclosure include fluid lenses having appreciably reduced or substantially eliminated gravity sag, compared, for example, to an equivalent constant-tension lens with the same average tension. Examples also include fluid lens having improved optical uniformity across the field of view. In some examples, the membrane profile may have reduced deviations from symmetry due to gravitational effects.

Gravity sag may be reduced by increasing the line tension in the membrane, for example, by using a high membrane tension of over 200 N/m. However, increasing the membrane tension may exert similarly scaled higher forces on other fluid lens components, such as support structures, support rings, and in some examples, actuators. In some examples, the average line tension of a lens may, surprisingly, be reduced, while still improving optical properties by providing a spatial variation of line tension over the membrane. In some examples, a reduced average line tension may enable reduced support structure stiffness, and may require less bulky components. In some examples, a reduced average line tension may enable the membrane to be thinner, on average. In some examples, a reduced average line tension, combined with a reduced support ring stiffness, may enable a reduced actuation energy, and hence the mass of one or more of the actuator, support structure, membrane, or power supply may be reduced.

Figure 7A:
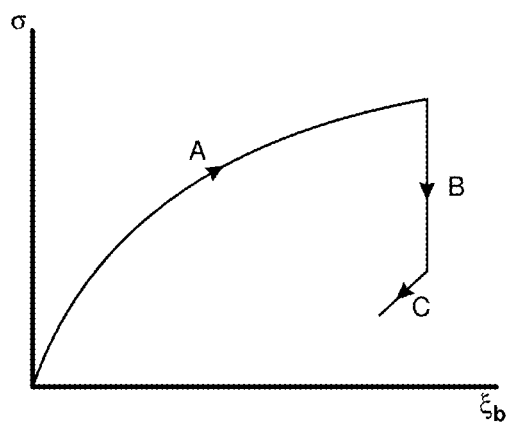
FIGS. 7A-7C illustrate the effect of biaxial strain during example membrane processing operations.
Figure 7B:
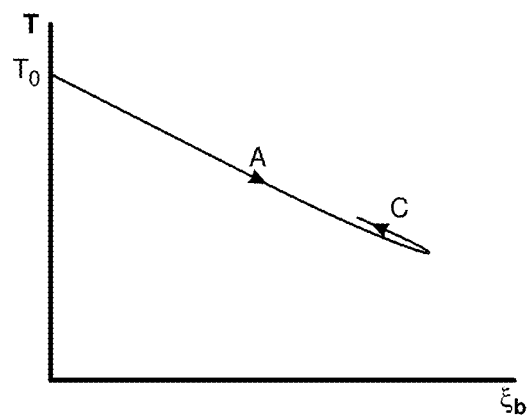
Figure 7C:
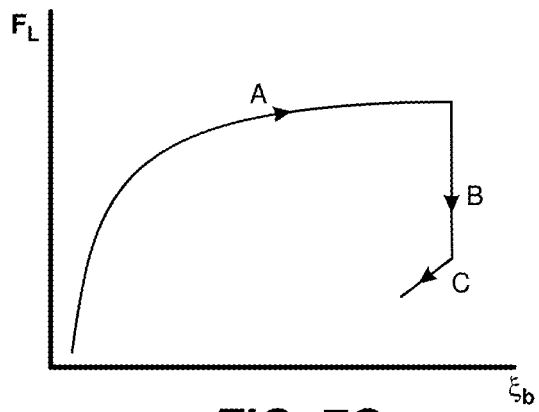

FIGS. 7A-7C shows plots of stress $\sigma$ (FIG. 7A), thickness T (FIG. 7B), and line tension $F_L = \sigma T$ (FIG. 7C), as functions of biaxial strain ($\xi_b$), for example, during assembly of a fluid lens including a membrane. In the curve portions labeled "A", a sheet of elastomeric material is biaxially stretched to a desired strain and held at that strain by clamping or some other means. In the curve portions labeled "B", the membrane is thermally relaxed to a lower stress/tension at fixed strain. In the curve portions labeled "C", fluid absorption into the membrane may cause the membrane to swell and lose tension. Membrane swell in the fixed clamp/support may be characterized by a strain reduction.

FIG. 7C, in particular, shows that fluid absorption may lead to appreciable strain reduction. By adjusting the fluid absorption of a membrane as a function of position, a spatial variation may be imparted to the membrane strain and this may be used to compensate for gravity sag.

Figure 8:
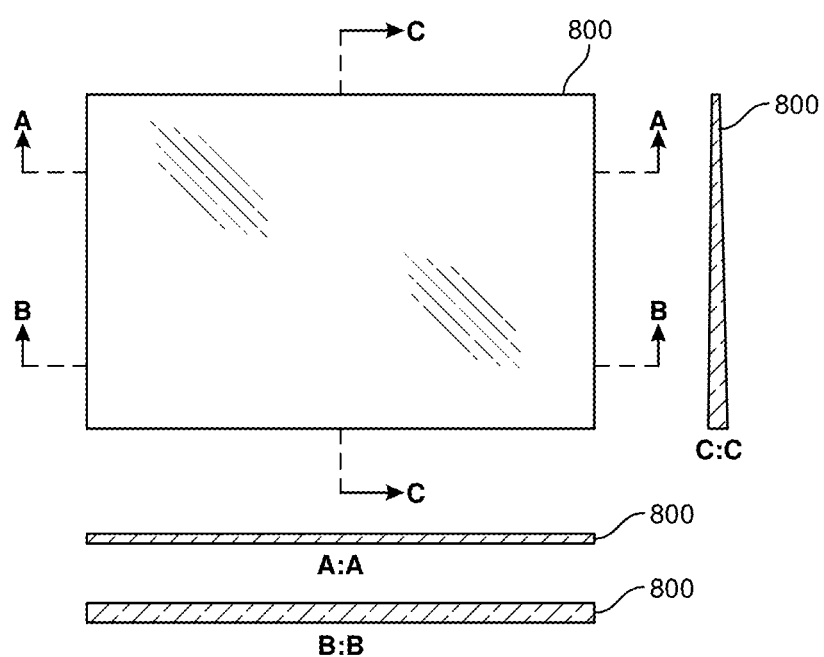
FIG. 8 illustrates a linear variation of membrane thickness along a particular direction, according to some embodiments.

FIG. 8 shows a sheet of membrane material 800 before stretching. The membrane material 800 has variable thickness, in this example a linear variation with height with a greater thickness within a lower portion (as illustrated) material. The figure also shows a vertical cross-section (C:C), showing an approximately linear variation in membrane thickness along a particular direction (in this example, the vertical direction), and the thickness along two horizontal cross-sections (A:A and B:B), from thinner and thicker portions of the material respectively. The thickness may be generally uniform along the horizontal direction. In some examples, a device may include a fluid lens with a membrane having a greater thickness within a lower portion. For example, the membrane may have a generally linear thickness variation with position along a vertical direction when the device is worn by the user (e.g., in a conventional standing or sitting position.) In this direction, the term "vertical" may refer to a generally radial direction away from the center of the Earth, or a direction of increasing height.

FIGS. 9A-9B illustrate an example apparatus for extruding a thermoplastic material as a variable thickness film. The apparatus, shown in part at 900, receives one or more profiled liners, such as 902 and 904. Polymer melt 908 may be extruded through flat die head 906. An extruder barrel, screw, gear pump, heating apparatus, or other equipment as known in the art may be used, and are not shown for illustrative clarity. Polymer melt 908 may travel a short distance before being encapsulated between liners 902 and 904. The dashed lines shown on liner 902 may schematically represent the repeat distance of a textured pattern, such as shown in FIG. 9C. The combination of liners 902 and 904, and polymer melt 908, may pass between rollers 910 and 912. One or more liners may have a profile such that, in combination with a profiled thickness extrusion from the extrusion die, the extruded polymer film 914 (formed from the polymer melt) has the desired thickness profile after the liners are removed.

FIG. 9C shows first liner 902 having a thickness profile, and a second liner 904 having a uniform thickness profile. The extruded thermoplastic film 914 may then have a planar surface (adjacent the uniform second liner) and a surface profile complementary to that of the first liner (adjacent the first liner), and a resulting thickness profile. In this example, the liners illustrated in FIG. 9C may impart a thickness profile having portions having a linearly variable thickness. Membranes may then be fabricated from such portions. In some examples, a liner such as 902 may have a generally prismatic or sawtooth profile.

In some examples, one liner may have a generally planar profile, and the other liner may have a thickness that varies with a function of position. In some examples, both liners may have a profile that varies with position. In some examples, the liners may be omitted, and the spacing between the rollers may vary as a function of position. In some examples, the liners may include a polymer, such as a fluoropolymer.

Gravity sag may include the undesired deformation of a membrane due to a hydrostatic pressure gradient in the fluid. Given a fluid of density $\rho$ and refractive index n and a membrane of (constant) tension $F_{LO}$, a first order of the gradient of optical power $\Phi$ with height z may be expressed as (Equation 1):

$$\frac{d\Phi}{dz} = -\frac{\rho g(n-1)}{2F_{L0}},$$

where g is the acceleration due to gravity.

In some examples, a fluid lens includes a membrane having a tension that varies as a function of height to counteract the hydrostatic pressure gradient in the fluid, and thereby improve the optical quality of the lens.

Taking z=0 in the middle of the lens, and assuming spherical optics in a quasi-static lens yields (Equation 2):

$$\Phi(p_0, z) = \frac{(n-1)(p_0 - \rho g z)}{2F_L(p_0, z)}$$

where the subscript "0" refers to the center height of the lens, and p represents pressure. Tension may be a function of $p_0$ as well as height, to represent a tension increase with strain when the membrane becomes more distended. As an example, a membrane may be tuned to provide perfect first-order gravity sag cancellation at some mid-range optical power (Equation 3):

$$F_L = F_{LO} - Az + Bp_0$$

where:

$$A = \frac{\rho g(n-1)}{2\Phi_{ref}},$$

and B is an empirical scaling factor dependent on the membrane thickness and modulus. In one example, B is of the order of 0.005 m for an elastomeric membrane. The term $F_{LO}$ represents the tension at mid-height and zero pressure.

Figure 10:
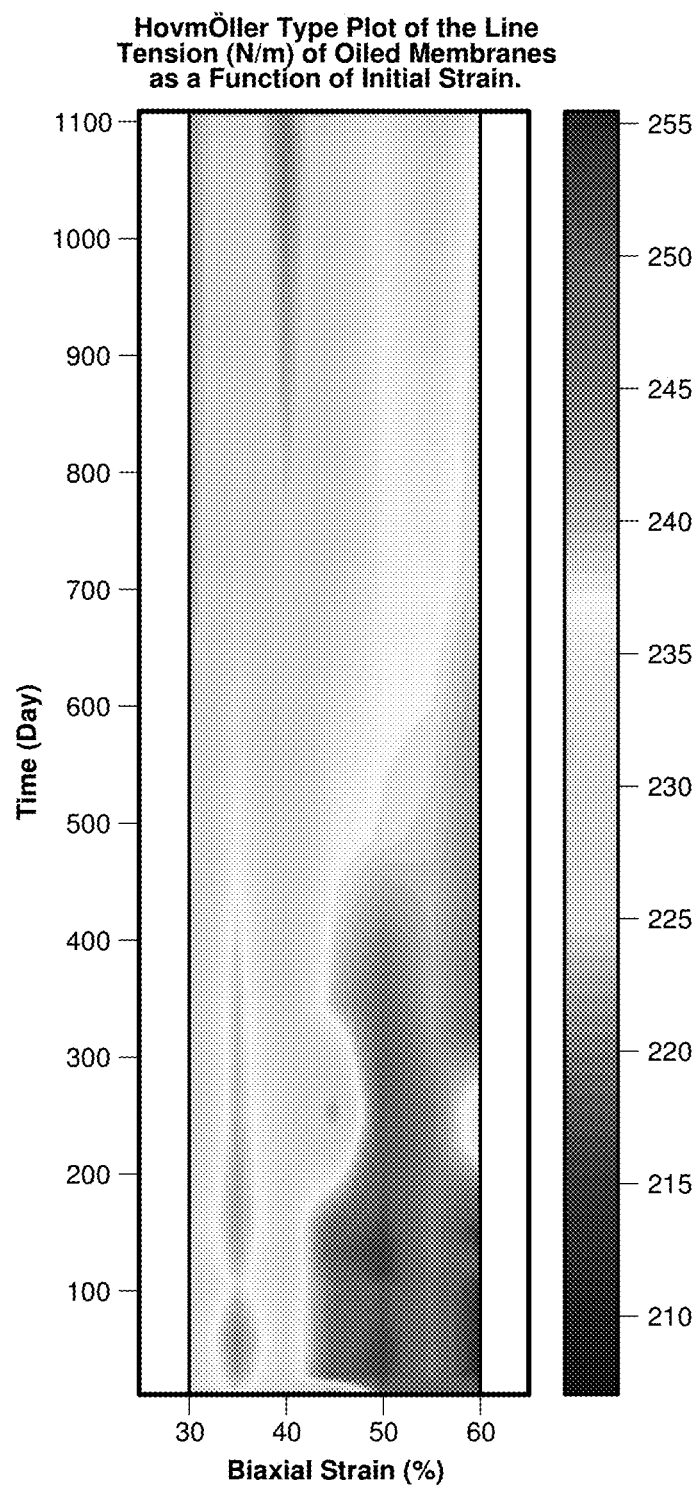
FIG. 10 shows line tension as a function of time and initial biaxial strain, according to some embodiments.

FIG. 10 shows an example Hovmöller diagram of line tension as a function of time and initial biaxial strain, obtained using eighteen elastomeric optical membranes in contact with a lens fluid. The plot shows that steady state tension may be weakly dependent on strain for a given membrane material. A doubling of biaxial strain may give a ten percent increase in tension. In the figure, the region in the lower right generally represents higher numerical values (e.g., approximately 250) than the upper left region.

Figure 11:
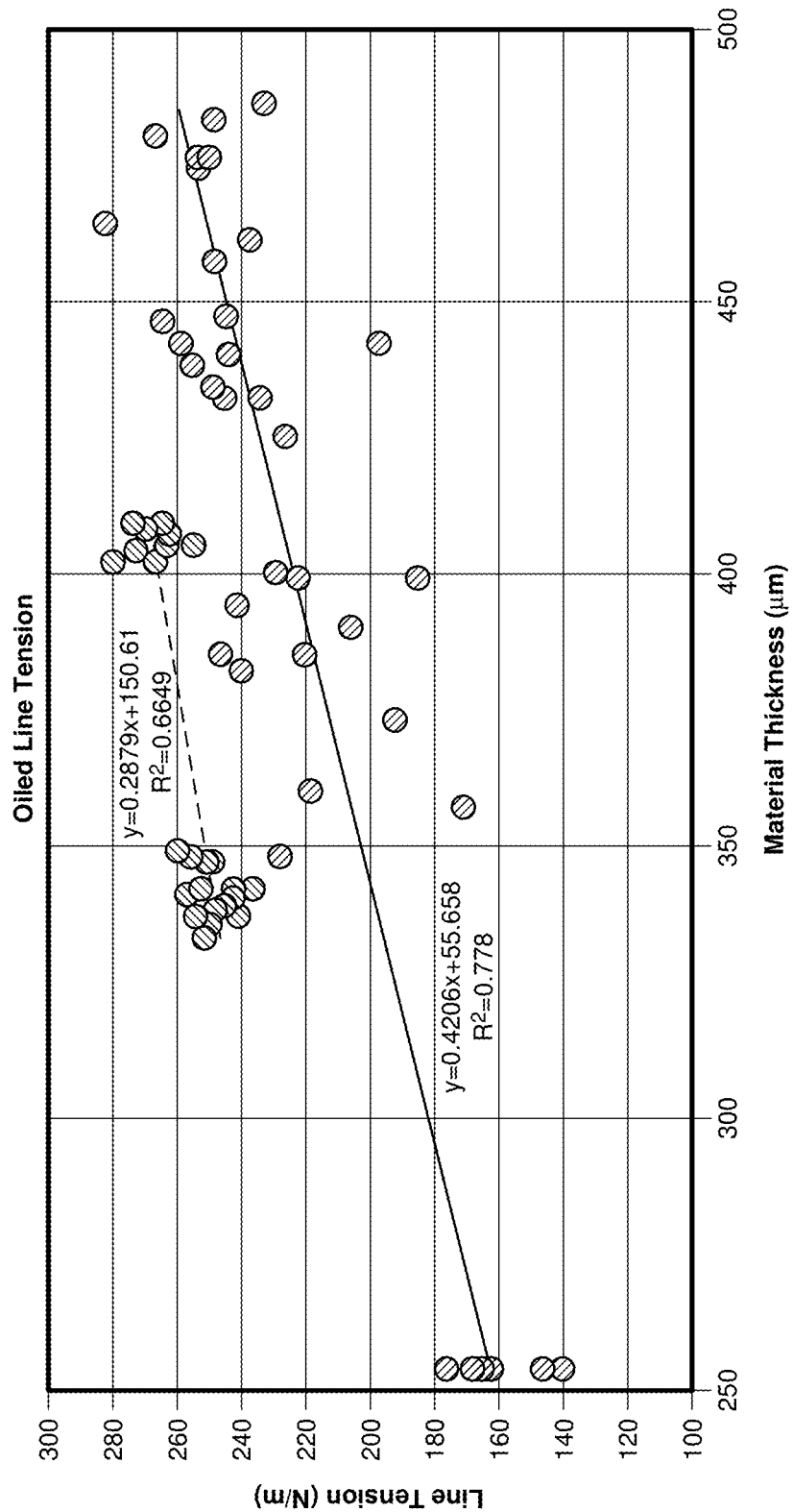
FIG. 11 illustrates line tension as a function of membrane thickness, according to some embodiments.

FIG. 11 shows oiled tension against initial thickness for two example membrane materials (27 samples of a first material, and 40 samples of a second material). The raw material may be nominally the same for all membranes of the lower data set, but included stretched materials from different suppliers and ages, which is seen to affect the tension and introduce what may be termed noise in the data. The upper data set is less noisy, as the materials were extruded on the same day and were from the same supplier. In this context, the term "oiled" may refer a membrane that is in contact, or has been in contact with, a lens fluid such as a silicone oil. The term "oiled tension" may, in some examples, refer to the tension in a membrane exposed to a lens fluid.

The data of FIGS. 10 and 11 show that a membrane whose thickness varies with height has a tension when stretched and oiled that may be given by (Equation 4):

$$F_L(p_0, h) = F_{L250} T_0(z)/T_{ref} + Bp_0$$

where $T_0$ is initial thickness, $T_{ref} = 250 \times 10^{-6}$ m, and $F_{L250}$ is a tension scaled to the reference initial thickness.

Figure 12C:
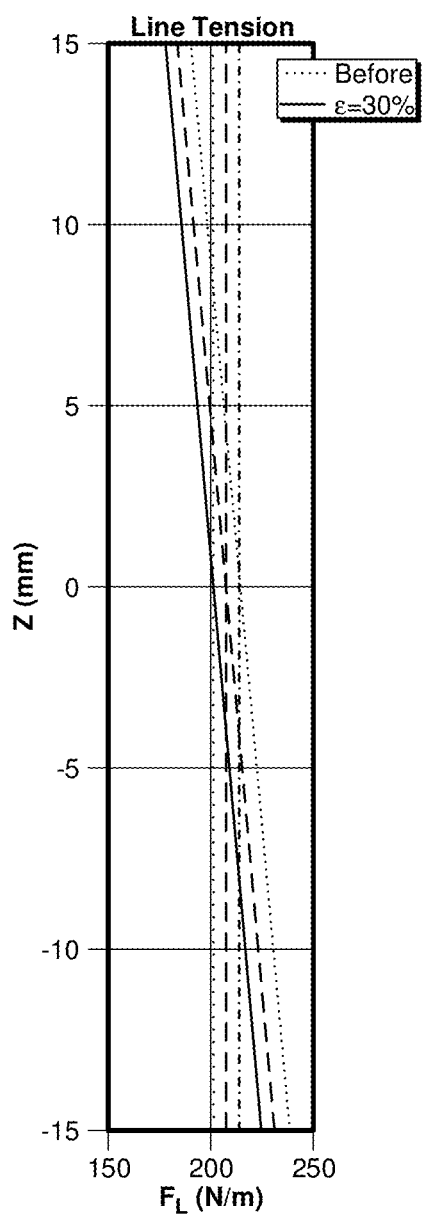
Figure 12D:
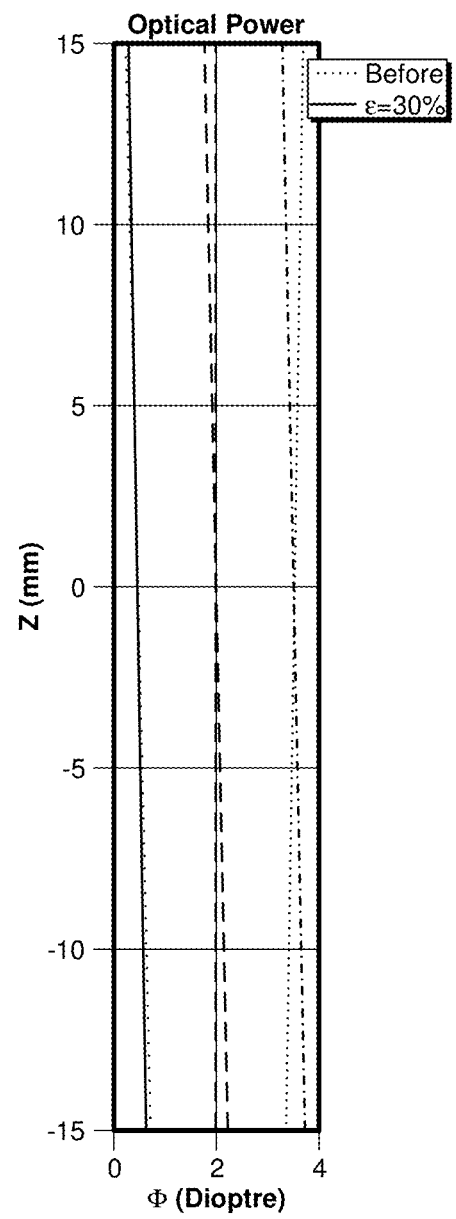

FIGS. 12A-12D show calculations for a single lens for a representative membrane material. FIG. 12A show the pressure versus height in the lens for three different actuation states (represented by solid, dashed, and dotted lines). FIG. 12B shows thickness versus height before (left) and after (right) a biaxial 30% strain. FIG. 12C shows line tension against height at three actuation states. FIG. 12D shows optical power as a function of height at three actuation states. In FIGS. 12B-12D, the dotted lines represent similar properties for an equivalent membrane having a generally uniform thickness.

The thickness profile may balance gravity sag at a reference power, for example, a reference power ($\Phi_{ref}$) equal to 2.0 D. In some examples, the profiled membrane may undercompensate gravity sag at lower optical powers and overcompensate gravity sag at higher optical powers, relative to the reference power. In this context, the term power may refer to an optical power, that may be expressed in diopters (D).

Figure 13A:
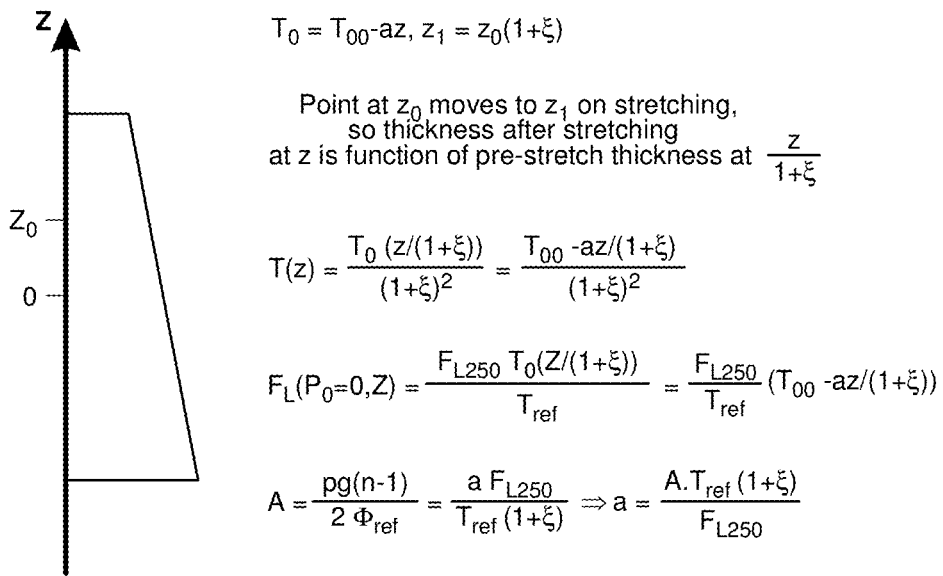
FIGS. 13A-13B illustrate an example relationship between an initial thickness profile as a function of height and a variation in line tension as a function of height.
Figure 13B:
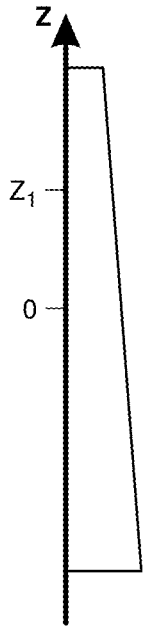

FIGS. 13A and 13B illustrate example calculations relating an initial thickness profile $T_0(z)$ to a line tension $F_L(z, p_0=0)$. For each figure, the vertical axis represents a distance along a particular direction (such as height), and the horizontal direction (the axes are not explicitly shown) represents membrane thickness as a function of height. The figures show the relationship between the membrane thickness before and after stretching. FIG. 13A shows the membrane thickness T(z) (as a function of height, z, before stretching), and FIG. 13B shows the post-stretch membrane thickness. The lens center may be at z=0.

For example, $T_{00}$ may represent the pre-stretch thickness at z=0, $T_0$ may be the pre-stretch thickness (that may be a function of z), T may be the post-stretch thickness (that may be a function of z), $\xi$ may be the biaxial strain, $F_{L250}$ may be the in-use line tension scaled to a reference thickness, and $T_{ref}$ may be the reference thickness, such as 250 microns $T_0$ may be given by (Equation 5):

$$T_0 = T_{00} - az, \quad z_1 = z_0(1+\xi)$$

where a is a constant, and z is the height dimension. Other parameters are defined above. This relationship is illustrated in FIG. 13A. The point $z_0$ moves to $z_1$ after stretching. The membrane thickness after stretching as a function of z may be based on the pre-stretch membrane thickness as a function of $z/(1+\xi)$. Then, the following relationship may be established (Equation 6):

$$T(z) = \frac{T_0(z/(1+\xi))}{(1+\xi)^2} = \frac{T_{00} - az/(1+\xi)}{(1+\xi)^2}$$

Also, the following relationship may be established (Equation 7):

$$F_L(P_0 = 0, Z) = \frac{F_{L250} T_0(Z/(1+\xi))}{T_{ref}} = \frac{F_{L250}}{T_{ref}}(T_{00} - az/(1+\xi))$$

Therefore (Equation 8):

$$A = \frac{pg(n-1)}{2\Phi_{ref}} = \frac{aF_{L250}}{T_{ref}(1+\xi)} \Rightarrow a = \frac{A \cdot T_{ref}(1+\xi)}{F_{L250}}$$

The above relationship may be used to determine the constant term "a", and therefore determine an example pre-stretched membrane thickness as a function of position along a particular direction.

Figure 14:
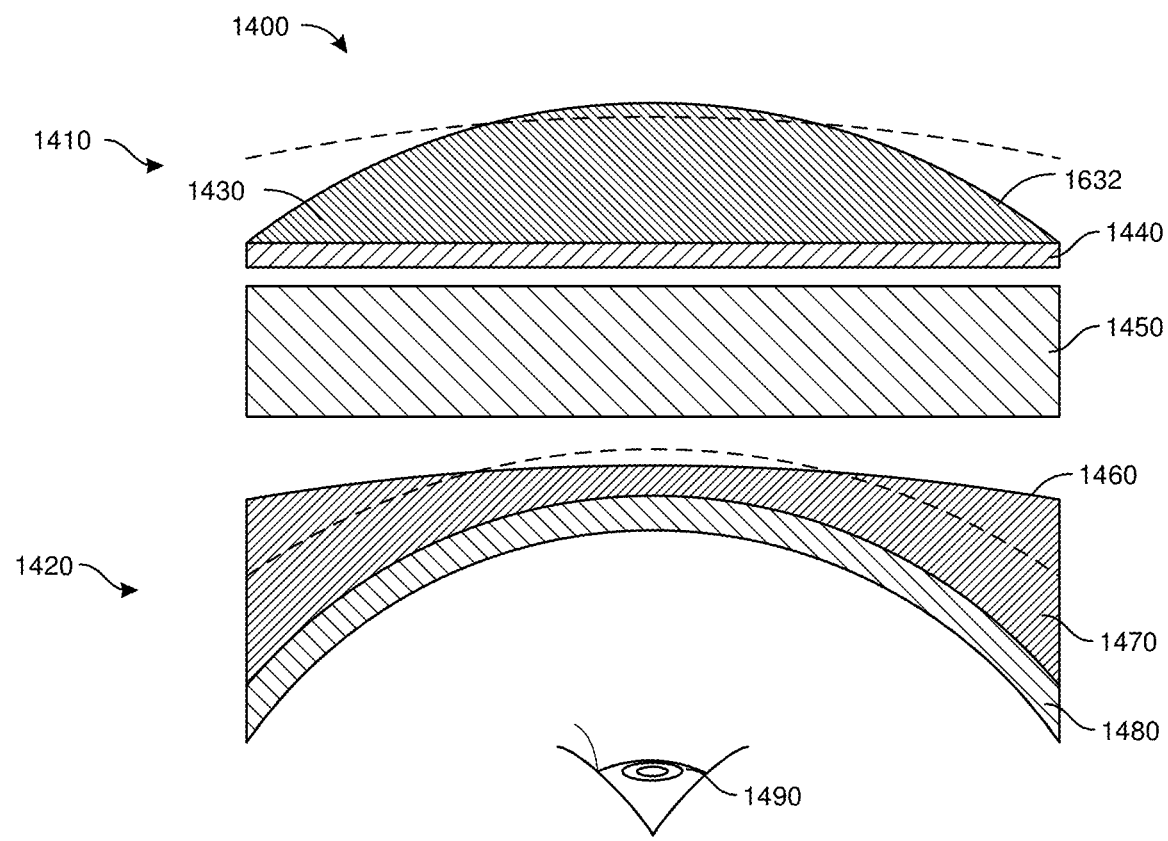
FIG. 14 shows an example configuration of a pair of adjustable fluid lenses, for example, for augmented reality applications, in which gravity sag is corrected for outside world viewing.

FIG. 14 represents a cross-sectional view of an example lens assembly 1400, that may be used in an augmented reality (AR) device. In this example, the lens assembly 1400 may include a front lens 1410, a rear lens 1420, and a display 1450. The display 1450 may be generally transparent (apart from any displayed virtual elements), and may be a component of an augmented reality system. Rear lens 1420 may be an adjustable lens, that may change the focal plane of the virtual or augmented reality content projected from the display. In this example, the rear lens may include a generally rigid substrate 1480, which in this example provides a generally concave rear surface for the lens assembly, and for fluid-filled enclosure 1470. The rear lens 1420 may be adjusted by adjusting the profile of the membrane 1460 (and the dashed line indicates an alternative profile with a different focal length. In this context, the terms front and rear may relate to positions relative to the eye. For example, a rear surface may be closer to the eye than a front surface, and light from the outside environment may pass through a front element or surface before passing through a rear element or surface, on the way to the eye (shown at 1490). Front lens 1410 may also be an adjustable lens, having substrate 1440 and fluid-filled enclosure 1430, and may be used to correct the view of the real world. In some examples, the adjustable lenses 1410 and 1420 may have complimentary optical powers, such that the net optical power through the device is zero. In some examples, the adjustable lenses 1410 and 1420 may provide ophthalmic vision correction, for example, for the outside world by the lens combination. The fluid-filled enclosure 1430 may be at least partially defined by substrate 1440 and membrane 1432. A dashed line shows an alternative profile of membrane 1432.

Figure 15:
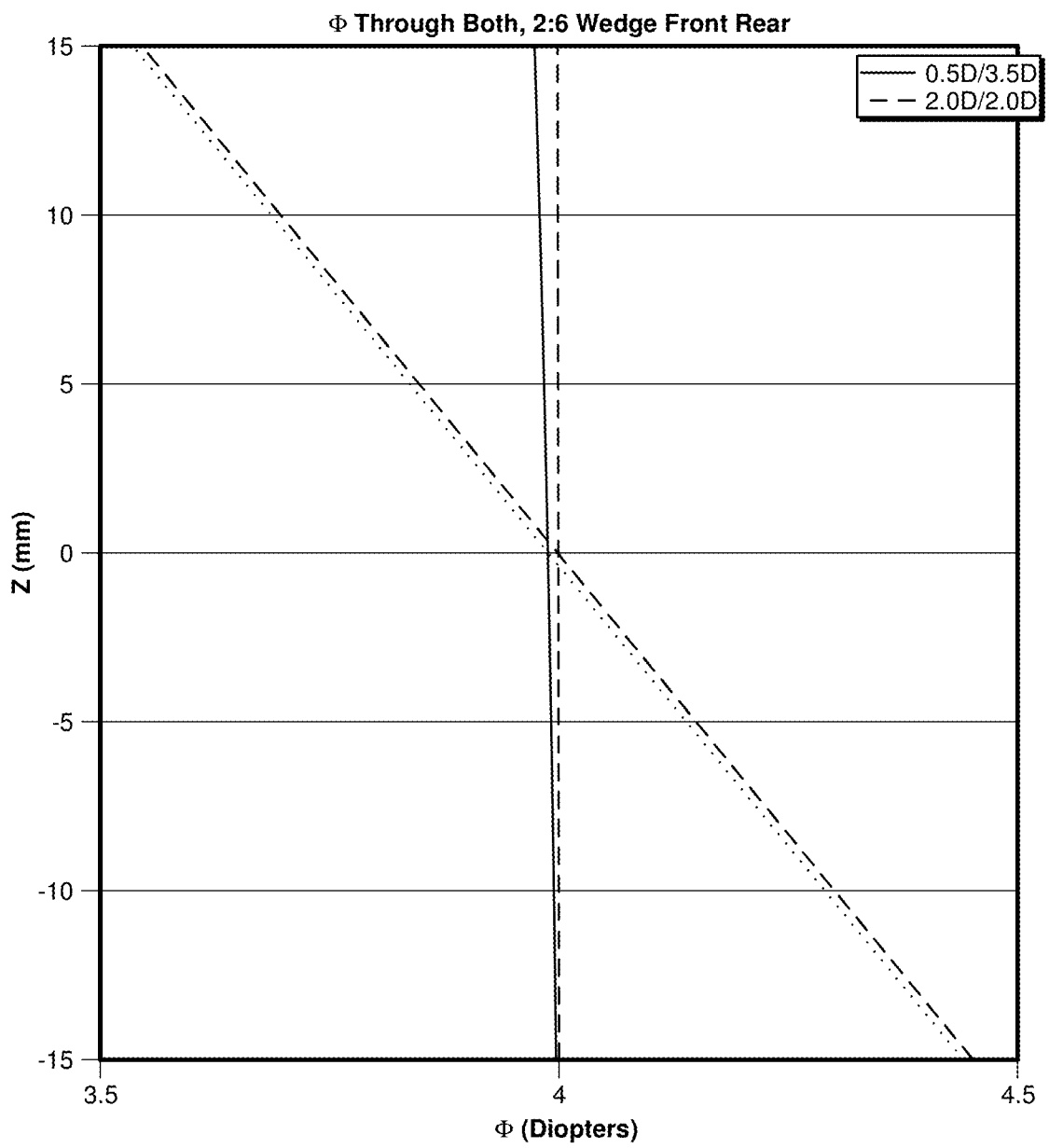
FIG. 15 shows an example gravity sag correction, in which the optical power (in diopters) is approximately invariant with height after compensation.

FIG. 15 shows example calculated through-lens optical powers as a function of height for the lens configuration of FIGS. 14. Results for an example fluid lense configured to compensate for gravity sag are shown as dashed lines, while results for an equivalent lens configuration without gravity sag compensation (e.g., having a constant membrane tension) are shown using a dotted line. The figure shows that the lens configuration of FIG. 14 may be almost perfectly compensated for gravity sag at all optical powers for through-lens (outside world) viewing, as shown by the approximately vertical dashed line at approximately 4 diopters. However, the virtual content may still be subject to single lens gravity sag, as shown by the approximately diagonal dashed and dotted lines.

Figure 16:
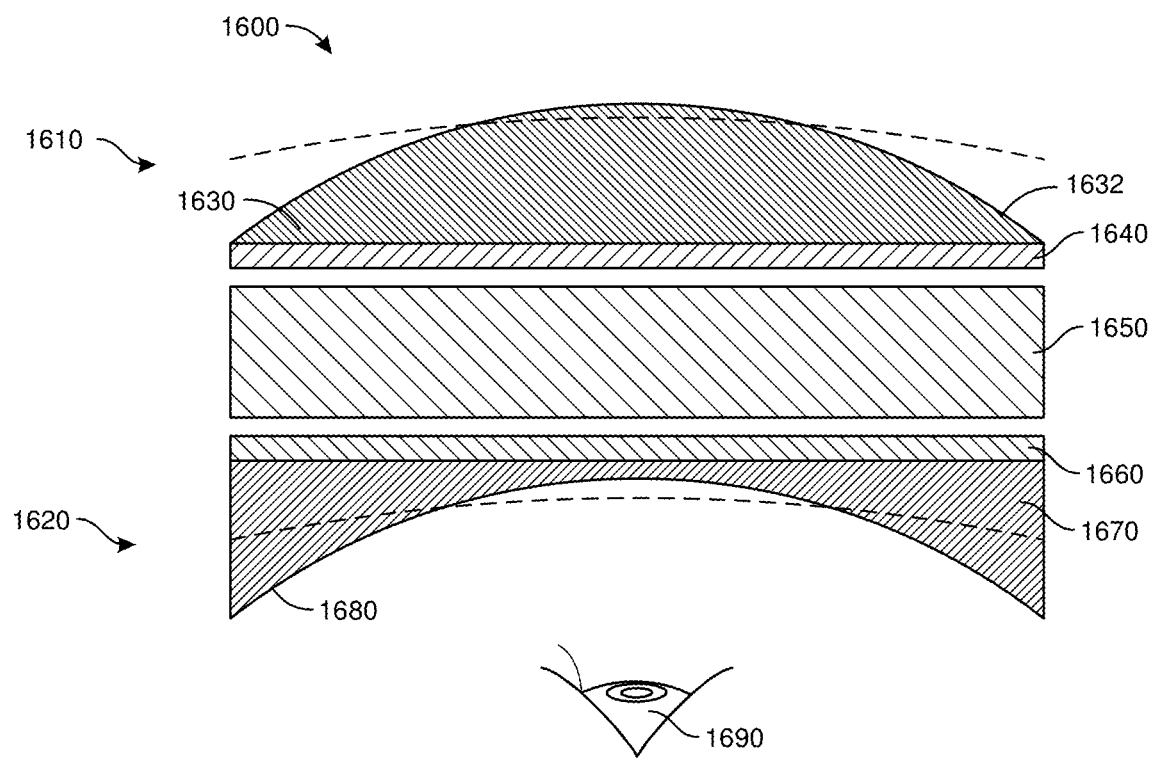
FIG. 16 also shows an example configuration of a pair of adjustable fluid lenses, for example, for augmented reality applications.

FIG. 16 represents a cross-sectional view of an example lens assembly 1600, that may be used in an augmented reality (AR) device. In this example, the lens assembly 1600 may include a front lens 1610, a rear lens 1620, and a display 1650. The display 1650 may be generally transparent (apart from any displayed virtual elements), and may be a component of an augmented reality system. Rear lens 1620 may be an adjustable lens, that may change the focal plane of the virtual or augmented reality content projected from the display. In this example, the rear lens may include a generally rigid substrate 1660, which in this example is generally planar. Front lens 1610 may also include an adjustable lens, and may be used to correct the view of the real world. In some examples, the adjustable lenses 1610 and 1620 may have complimentary optical powers, such that the net optical power through the device is zero. In some examples, the adjustable lenses 1610 and 1620 may provide ophthalmic vision correction, for example, for the outside world by the lens combination. The front lens 1610 may include a fluid-filled enclosure 1630, at least partially defined by substrate 1640 and membrane 1632. A dashed line shows an alternative profile of membrane 1632. The rear lens 1620 may include a fluid-filled enclosure 1670, at least partially defined by substrate 1660 and membrane 1680. A dashed line shows an alternative profile of the rear membrane 1680.

Figure 17:
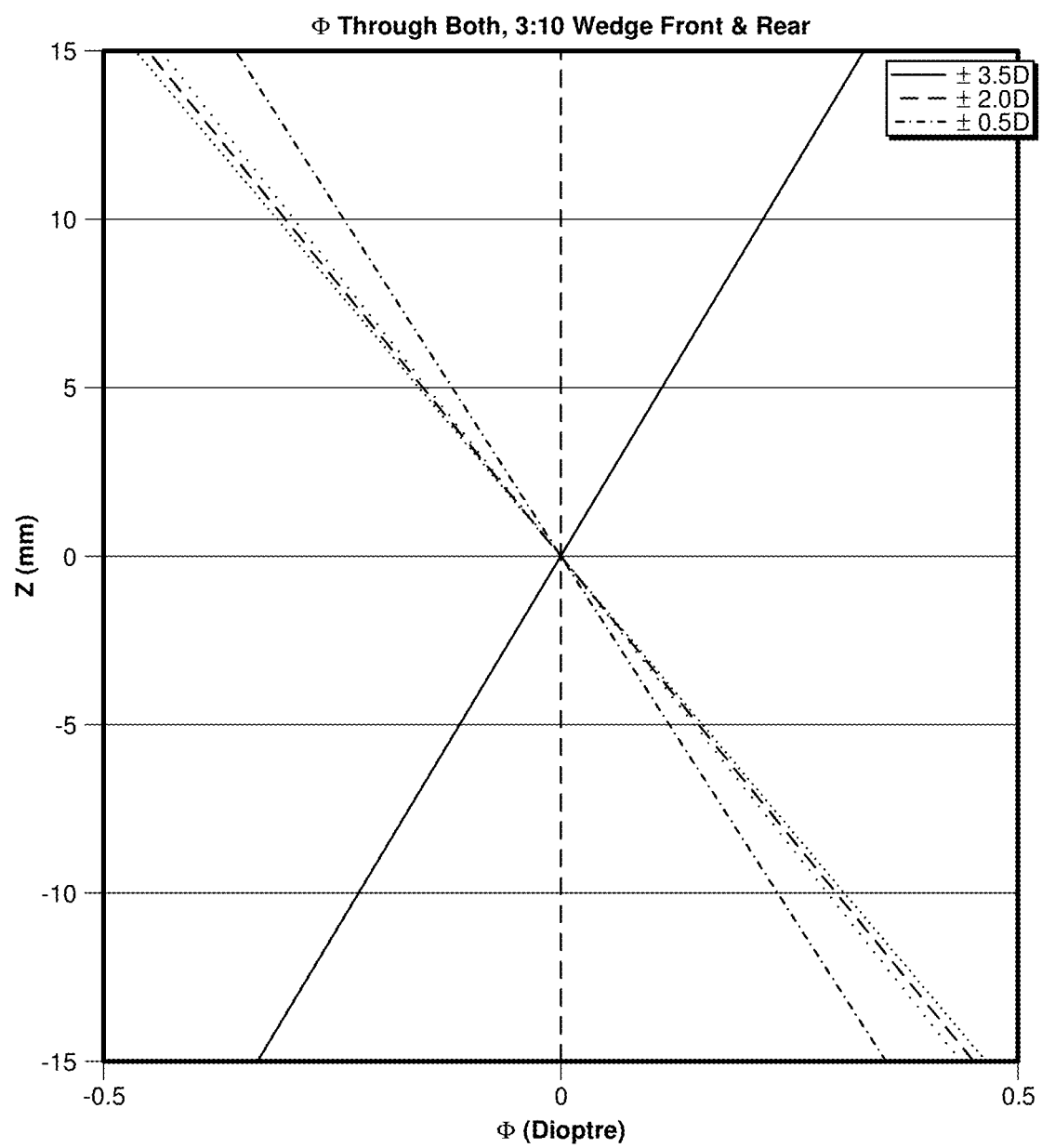
FIG. 17 shows an example gravity sag reduction, in which the optical power (in diopters) has a reduced variation with height after compensation.

FIG. 17 shows example calculated through-lens optical powers as functions of height for the lens assembly of FIG. 16. Results for example membranes configured to compensate for gravity sag are shown as solid lines, while equivalent non-compensating constant tension membranes are shown as dotted lines. For the configuration of FIG. 16, some through-lens compensation may be provided, but gravity sag may not be completely eliminated, in comparison to the example lens assembly shown in FIG. 14.

Figure 18A:
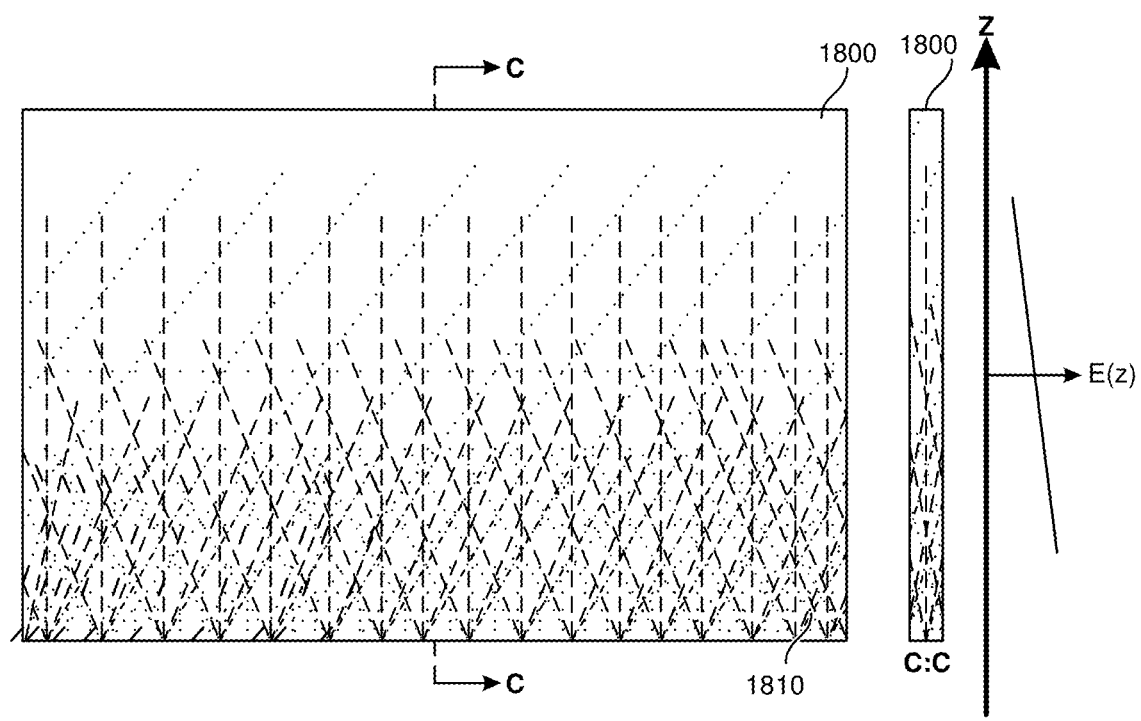
FIGS. 18A and 18B illustrate how a spatial variation in a degree of cross-linking (e.g., using a variation in the concentration of initiator, radiation exposure, and the like) may be used to obtain a variation of line tension in a fluid lens, in some embodiments.
Figure 19:
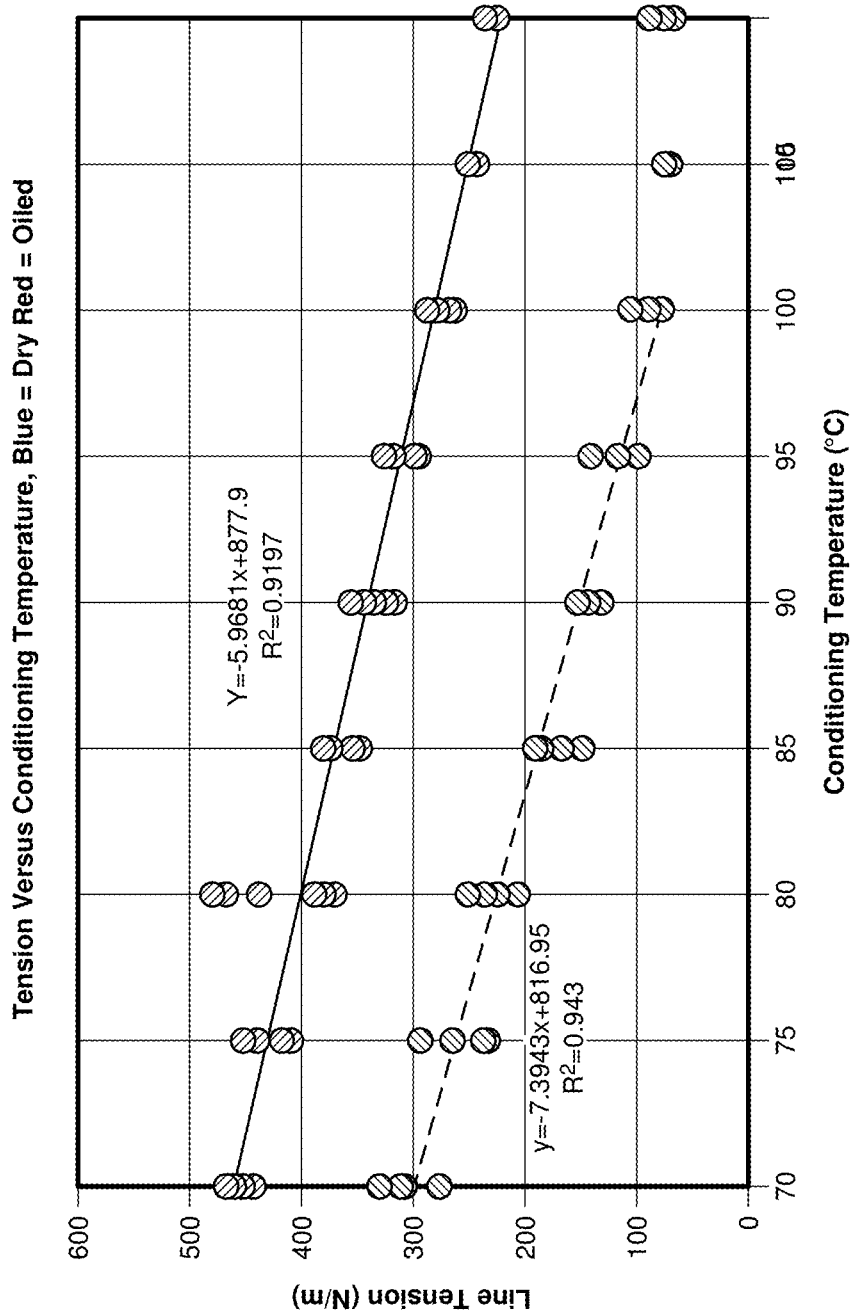
FIG. 19 illustrates how a spatial variation in a conditioning temperature (e.g., using a variation in heat exposure time, and the like) of a membrane material may be used to obtain a variation of line tension in a fluid lens having a membrane formed from the membrane material.

FIG. 18A is a schematic representation of another example in which a sheet of membrane material 1800 has a generally uniform (or flat) cross-section (e.g., having a generally constant membrane thickness), and is selectively cross-linked by application of a treatment agent. The cross-section (C:C) is shown on the right of the figure, along with a qualitative schematic representation of cross-linking density. The treatment agent may include, in this example, a cross-linking agent 1810, with the spatial distribution of the cross-linking agent represented schematically by a dashed line density representing a greater application within lower portions of the membrane (as illustrated). Cross-linking agent 1810 may include a fluid chemical. The cross-linking agent may be applied as a spray or paint, or may be applied to the membrane as a vapor-phase chemical applied within a carrier gas stream.

Once the cross-linking is effected by action of the agent itself, and/or by activation by a catalyst or other method such as UV radiation or heat, the sheet of membrane material 1800 may have one or more elastic constants with a spatial variation, such as an elastic modulus (E) that is a function of height E(z), as shown in the symbolic representation to the right of the figure. When biaxially stretched, the example variable modulus membrane may have a tension function $F_L(z)$ that corrects for gravity sag.

Suitable cross-linking agents may include polyfunctional acrylates, such as difunctional or trifunctional acrylates, or other materials. Hence, during processing of a membrane material, a spatial variation in the degree of cross-linking may be introduced along a particular direction, and this may result in a spatial variation in line tension in the membrane of a fluid lens.

In some examples, a monofunctional monomer may be coated or absorbed into the membrane and cured, where the amount of monofunctional monomer coated or absorbed is greater near the bottom than the top of the membrane. Alternatively, a combination of monofunctional and polyfunctional monomers may be used. Suitable monomers may include polydimethylsiloxane, epoxies, acrylates, urethanes, and other curable monomers. The monomers may be cured by further incorporating suitable initiators or catalysts and curing conditions, including thermal curing or applying actinic radiation such as UV light or electron beam.

Figure 18B:
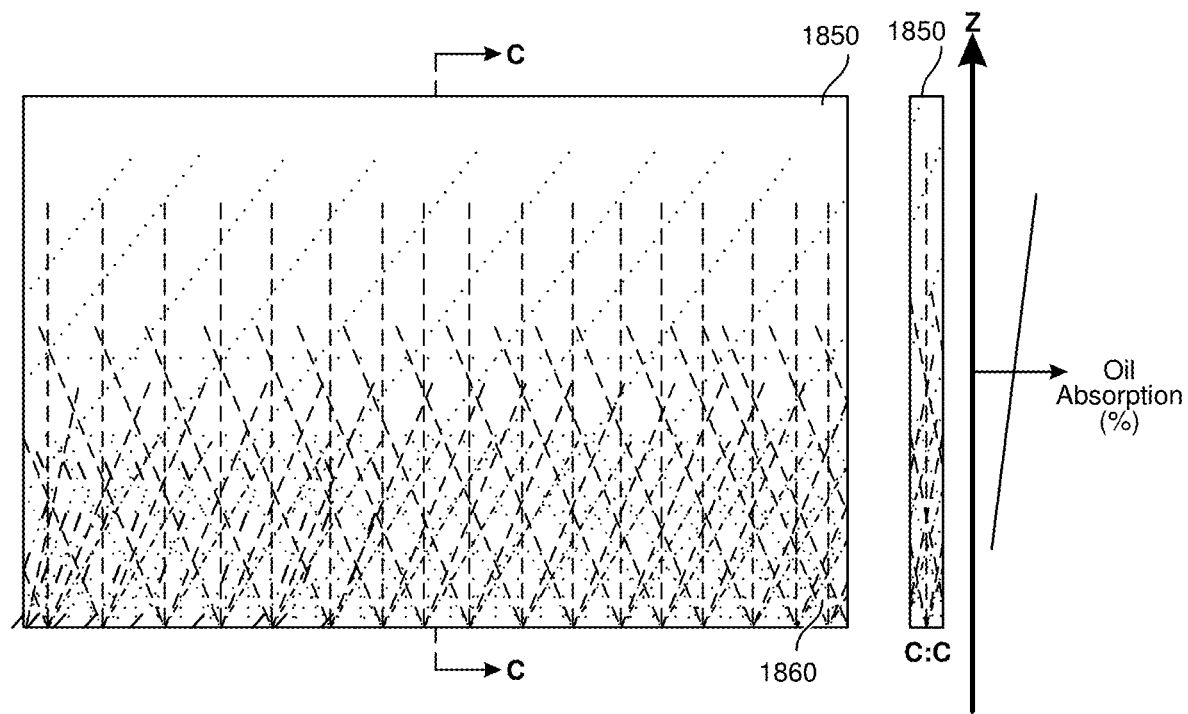

FIG. 18B illustrates another example in which a sheet of membrane material 1850 has a constant thickness, and a selectively applied treatment agent 1860 is used to modify the membrane's ability to absorb lens fluid. Agent 1860 may include a monomer mixed with an initiator, and may perfuse the membrane material to change the solubility parameter of the membrane material. When an appropriate level of perfusion has been achieved, the monomer may be polymerized by the action of UV radiation, catalysis, or other means. When the membrane is stretched and included in a fluid lens, the membrane may absorb some of the refractive fluid. Parts of the membrane that absorb less lens fluid may swell less, and this effect may be used to correct for gravity sag.

In relation to FIG. 7A discussed above, the reduced fluid absorption by the membrane may be represented by a shorter section (labelled C) from the end of step B, and the lower lens fluid absorption regions may then have a higher line tension. In some examples, a spatial variation in lens fluid absorption may be used to correct for gravity sag.

An example described approach to compensate for gravity sag may, in some examples, be combined with one or more other example approaches. In some examples, a spatially variation in chemical modification of the membrane may be combined with a spatial variation in membrane thickness. In some examples, a spatial variation in one or more composition parameters may be combined, such as a spatial variation in one or more of the following composition parameters (as appropriate): cross-linking, local average degree of polymerization, additive concentration (e.g., a number or weight percentage of an additive), degree of polymerization of a polymer additive (e.g., for a polymer additive), degree of cross-linking of an additive (if appropriate), surface layer thickness, surface energy, or surface layer chemical composition.

A treatment agent (such as a cross-linking agent, or polymerizable material) may be applied to one or both surfaces of a membrane using one or more of various application methods. Example application methods include immersion, blade coating, jet coating, ink-jet coating (or other printing methods), vapor deposition, spray coating, or any other suitable treatment agent application process. In some examples, the line tension in a membrane may vary due to a spatial variation in conditioning temperature during preparation of the membrane.

FIG. 19 shows the dry and oil-swelled line tensions of an example membrane material, as a function of conditioning temperature. All membranes were between 0.400 mm and 0.412 mm thick before stretching, and samples were conditioned for the same time (one hour) at different temperatures. A stretched membrane may be differentially conditioned, for example, to make a fluid lens including a non-uniform tension membrane. In some examples, the conditioning temperature may have a spatial variation configured to impart a spatial variation on the line tension within the membrane, for example, when the membrane is used in a fluid lens.

Figure 20A:
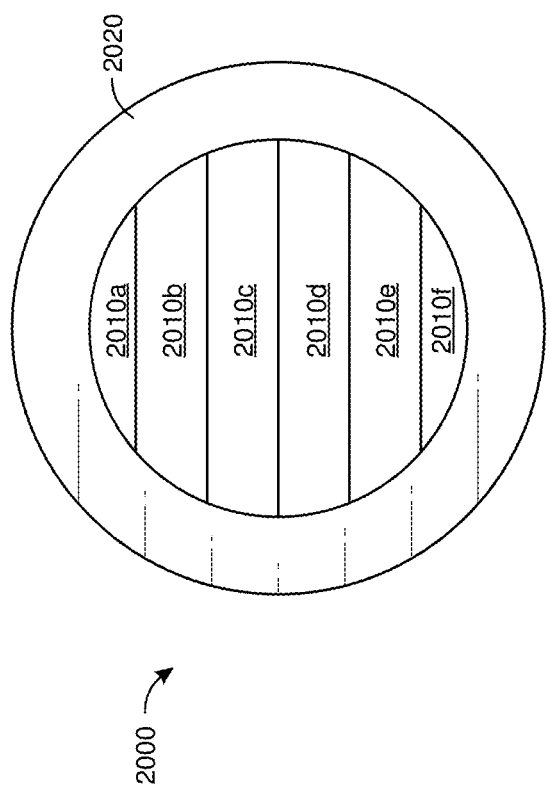
FIGS. 20A-20C show how thermally insulating masks may be used to control membrane conditioning temperature, and hence obtain a variation in line tension.

FIG. 20A shows a membrane assembly 2000 including a stretched membrane supported by a carrier ring 2020. By way of example, the membrane is divided into six zones designated 2010a-2010f. The membrane assembly 2000 may be conditioned using an oven (or other heater) at a minimum temperature, such as 60° C.

Figure 20B:
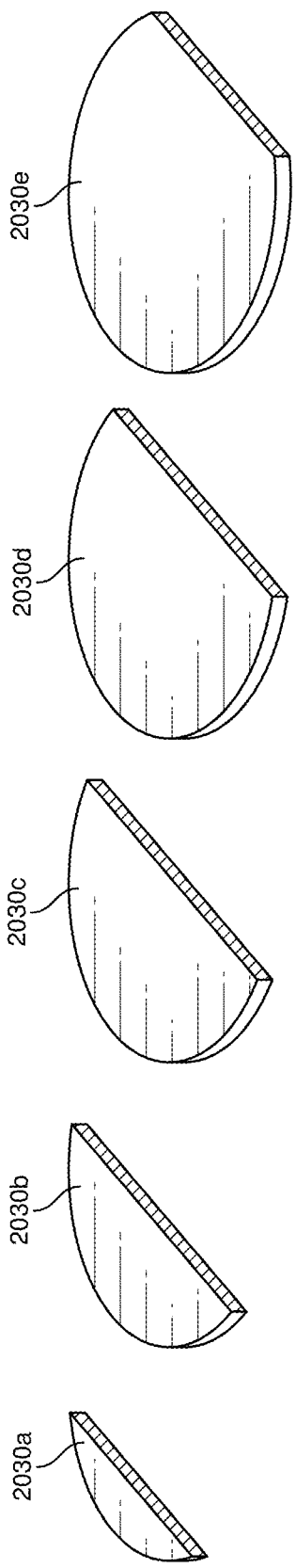

FIG. 20B shows that a series of insulating masks 2030a-2030e may be placed on or by the membrane, or otherwise placed adjacent or proximate the membrane. The insulating mask may be used to block the application of a heater to a corresponding portion of the membrane.

Figure 20C:
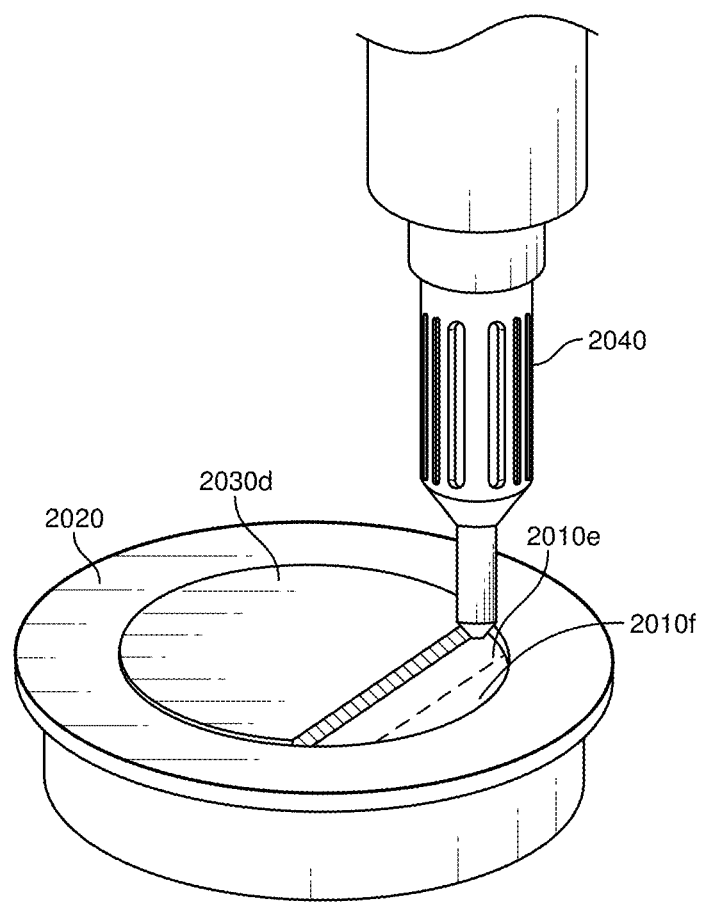

FIG. 20C shows a heater (such as a hot air blower) 2040 being be used to selectively heat an exposed area of the membrane 2010f to a predetermined temperature. This may be the maximum temperature used for membrane conditioning. Other zones of the membrane may be selectively heated to intermediate temperatures between the minimum and maximum temperatures.

In some examples, using first mask 2030a, zones 2020b-2020f of the membrane 2020 may be heated to a first temperature (e.g., 70° C.). Then, using second mask 2030b, zones 2020c—2020f may be heated to a second temperature (e.g., 80° C.), and so on, until zone 2010f is heated to a final or maximum temperature (e.g., 110° C.). When assembled into a fluid-filled lens, the membrane may be configured so that the membrane portion (or zone) 2010f with the maximum conditioning temperature may be uppermost and the membrane portion (or zone) with the lowest conditioning temperature is lowermost, so that line tension increases towards the bottom of the lens. More or fewer zones may be used as appropriate, the zones may be of unequal width, and the conditioning temperature gradient may be different to that described.

Figure 21A:
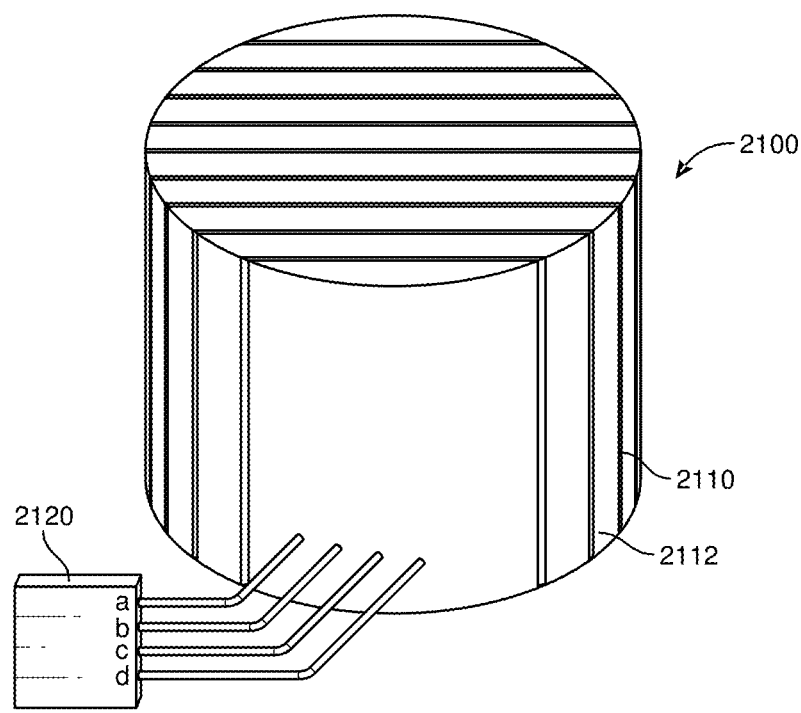
FIGS. 21A and 21B illustrate differential heating using a contact heater to control membrane conditioning temperature and hence obtain a variation in line tension.

FIG. 21A illustrates another differential heating method including use of a contact heater 2100. Heater 2100 includes alternating layers of thermally insulating (2110) and conducting (2112) materials. Each layer of thermally conducting material 2112 may include one or more electrical heaters and temperature measuring devices such as thermocouples or other devices, as is known in the art. A controller 2120 may be provided for each layer (only one controller is shown in the drawing for clarity), with the controller having connections labeled "a"-"d", where "a" and "b" may represent power connections, and "c" and "d" may represent sensor (e.g., a thermocouple-based sensor) connections.

Figure 21B:
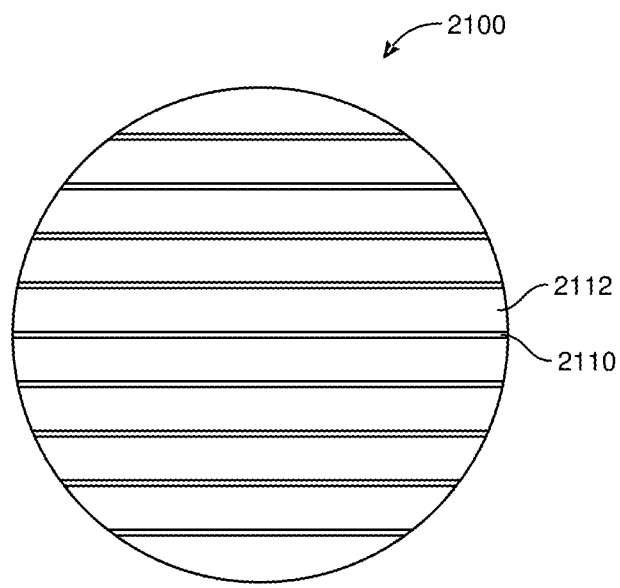

FIG. 21B shows a top view of the heater 2100, including alternating layers of thermally insulating (2110) and conducting (2112) materials.

In some examples, the controller 2120 may supply power to the heater and maintains its associated section of conducting material at the desired temperature. The top surface of the heater 2100 may be applied to a face of a stretched unconditioned membrane, for example, within in a carrier ring, to differentially heat the membrane so that its in-use line tension varies with position, such as height, within a lens application such as a head-mounted device.

In some examples, a method of modifying a polymer film, such as a membrane for a fluid lens, includes forming a layer of additive material on the polymer film (that may include, e.g., a polymerizable material, a solvent, and an initiator as needed), and in some examples allowing the additive material to infuse into the polymer film. The layer may be formed by any appropriate method, for example, ink-jet printing, spraying, spin-coating, and the like. Deposition techniques such as ink-jet coating, and variations in radiation exposure, may allow variation in the polymerization parameters obtained, and hence allow spatial variation of the membrane properties to be obtained as needed. In some examples, a deposited amount and/or concentration may be spatially varied. For example, thermoplastic polyurethane membrane may be modified by the infusion of a fluoroacrylate monomer, and variations in the polymerization parameter(s) of the fluoroacrylate monomer may be used to spatially vary the mechanical properties of the membrane, such as an elastic constant. For example, a fluoroacrylate (such as perfluoroheptylacrylate) and an initiator (e.g., phenyl bis(2,4,6-trimethylbenzoyl) phosphine oxide) may be perfused into the membrane. The fluoroacrylate may then be cross-linked (e.g., using UV) within the membrane, that may modify an elastic constant and may also reduce or effectively eliminate fluid diffusion into the membrane. In some examples, a layer having at least one spatially varying property may be formed on a membrane material. The at least one spatially varying property may include a degree of polymerization, degree of cross-linking, layer thickness, layer composition, layer elastic constant (e.g., rigidity), or other suitable parameter.

FIG. 22 illustrates an example method (2200) including: forming a membrane having a spatial variation in at least one membrane parameter (2210), for example, having a spatial variation along a particular direction; fabricating a fluid lens including the membrane (2220); and assembling a device including the fluid lens (2230), where the spatial variation in the at least one membrane parameter compensates for gravity sag in the membrane of the fluid lens, for example, when the device is worn by a user. In some examples, the spatial variation in the at least one membrane parameter along the particular direction induces a corresponding variation in the elastic constant of the membrane, and assembling the device includes configuring the fluid lens so that the elastic constant, such as an elastic modulus, of the membrane is generally greater within a lower portion of the fluid lens, when the device is worn by the user.

FIG. 23 illustrates an example method (2300) including: forming a membrane having a spatial variation in membrane thickness (2310); fabricating a fluid lens including the membrane (2320); and assembling a device including the fluid lens (2330), where the spatial variation in the membrane thickness compensates for gravity sag in the membrane of the fluid lens, for example, when the device is worn by a user. In some examples, a membrane may be treated and/or process (e.g., one or more of formed, extruded, or other manufacturing or processing technique) to induce the spatial variation in membrane thickness. In some examples, the membrane thickness may vary approximately linearly with distance along a particular direction. A device may be assembled so that the membrane thickness is generally greater within a lower portion of the fluid lens, when the device is worn by the user.

In some examples, a membrane may be processed by a method including removing a processing material from the membrane polymer that may leave voids within the membrane; infusing an additive material into the membrane so that the additive material may enter at least some of the voids; and (e.g., if the additive material is a polymerizable material) polymerizing the additive material to form a polymer additive that may extend through some or all of the membrane. The membrane may include an elastomer, and may be an elastomer membrane. The membrane polymer may be a thermoelastic polyurethane. The polymer additive may be different from the membrane polymer, and may include, for example, an acrylate polymer or a fluoropolymer, and may, in some examples, include a fluoroacrylate polymer. In some examples, polymerizing the polymerizable material may reduce the porosity of the membrane polymer, or otherwise reduce diffusion of the lens fluid into and/or through the membrane, but may not necessarily form a continuous network through the membrane. An example method may further include forming an adjustable fluid lens using the membrane. An example method may be a method of fabricating a membrane, or a method of fabricating a fluid lens including a membrane, or a method of fabricating a device including a fluid lens. In some examples, a degree of polymerization and/or a degree of cross-linking of the membrane polymer and/or additive polymer may be spatially varied, to allow compensation for gravity sag. In some examples, a membrane polymer may be stretched before one or more processing steps. For example, an additive material (such as a polymerizable material) may be infused into a stretched membrane.

In some examples, a fluid lens may include a substrate, a fluid, and a membrane such as a thermoplastic polyurethane (TPU) membrane. The fluid may include a phenylated siloxane, such as pentaphenyl trimethyl trisiloxane, that may sometimes be referred to as a silicone oil. A TPU membrane may include a processing wax, that may exude over time and also appears to promote fluid infusion into the membrane. A membrane, such as an elastomeric membrane, with improved mechanical and/or chemical stability may be obtained by preventing fluid infusion into the membrane. Wax may be removed, for example, using methanol. After wax removal, the free volume within the membrane may be filled with a cross-linked polymer. For example, a fluoroacrylate (such as perfluoroheptylacrylate) and an initiator (e.g., phenyl bis(2,4,6-trimethylbenzoyl) phosphine oxide) may be perfused into the membrane. The fluoroacrylate may then be cross-linked (e.g., using UV) within the membrane, reducing or effectively eliminating fluid diffusion into the membrane. In some examples, the membrane is pre-stretched before cross-linking. In some examples, the fluoroacrylate is introduced into a surface layer of the membrane, for example, sufficient to prevent fluid diffusion into the membrane. In some examples, the surface layer thickness may be varied to provide a spatial variation of mechanical properties, that may be useful for, for example, aspheric lenses and/or gravity sag compensation. In some examples, the membrane surface energy may be modified, for example, to prevent wetting by the fluid, or to obtain a spatially modified variation in the lens fluid effect on the membrane.

In some examples, one or more membrane parameters may have a spatial variation such that, accounting for gravity sag effects, a desired lens profile is obtained. The effects of gravity sag may be determined from parameters such as membrane mechanical properties, lens dimensions, and fluid density. The combination of the effects of gravity sag and spatial variations in one or more membrane parameters may be used to obtain a desired membrane profile, and hence a desired lens profile. A desired lens profile may be a spherical, aspheric, cylindrical, astigmatic, or other desired lens profile. In some examples, a membrane may have an anisotropic spatial distribution of a membrane parameter. In some examples, at least one membrane parameter may be spatially varied to form an aspheric lens, a lens with improved off-axis optical performance, a lens with reduced overall thickness of the lens, or a lens configured to reduce the actuators travel. In some examples, line tension may increase towards the bottom of the lens, and/or may have a lower value near the center of the lens and a higher value of line tension towards the edge of the lens. Applications include optics and other applications of fluid lenses.

In some example, a polymer membrane according to the present disclosure may include: a polymer material, such as a polymer film, for example, a thermoplastic polyurethane film; and an acrylate polymer network extending through the polymer material. The acrylate polymer may be a fluoroacrylate polymer. The polymer material may be a membrane component of a fluid lens. In some examples, the acrylate polymer may be formed by polymerization of molecular species including one or more polyfunctional acrylates. A polymerizable acrylate may include one or more polyfunctional acrylates.

In some examples, the polymer formed from the polymerization of the added polymerizable material (e.g., the polymer additive, such as an acrylate polymer) may have at least one parameter that is substantially different than that for the membrane material (e.g., including a membrane polymer such as a thermoplastic polyurethane). Example parameters may include at least one of the following: a solubility parameter, surface energy, hydrophobicity, or other parameter. For example, the polymer additive, such as an acrylate polymer, may have a substantially different solubility parameter and/or surface energy compared with the membrane polymer, such as a polyurethane used to form the membrane. In some examples, an acrylate polymer may be or include a fluoroacrylate polymer. A polymerizable acrylate material introduced into a polymer membrane may include one or more fluoroacrylate species.

In some examples, the membrane may include a thermoplastic polymer, such as a thermoplastic polyurethane (TPU). In some examples, the membrane may be pre-stretched before cross-linking an infused polymerizable material. Cross-linking of the polymerizable material may reduce thermal relaxation of the membrane material, allowing the membrane to be pre-stretched before cross-linking. For example, a polymer additive may include a cross-linked polymer formed from, for example, a polymerizable material including one or more polyfunctional molecular species.

In some examples, a polymerizable material (such as a fluoroacrylate) is introduced into a surface layer of the membrane, for example, to form an infused layer of sufficient thickness to prevent fluid diffusion into the membrane. In some examples, a polymer additive may be formed proximate one or both surfaces of the membrane, such as proximate a surface in contact with a lens fluid.

In some examples, a method of modifying a polymer film, such as a membrane for a fluid lens, includes forming a layer of additive material on the polymer film (that may include, e.g., a polymerizable material, a solvent, and an initiator as needed), and allowing the additive material to infuse into the polymer film. The layer may be formed by any appropriate method, for example, ink-jet printing, spraying, spin-coating, and the like. Deposition techniques such as ink-jet coating may allow variation in the polymerization parameters obtained, and hence allow spatial variation of the membrane properties to be obtained as needed.

In some examples, a method of fabricating a membrane for a fluid lens includes: removing a processing material from a polymer film, where the processing material is used in manufacturing the polymer film; introducing a polymerizable material (such as a polymerizable acrylate) into the polymer film; and polymerizing the polymerizable material into a polymer (such as an acrylate polymer) extending through the polymer film.

In some examples, a method of fabricating a membrane for a fluid lens includes: providing a polymer film including voids distributed through the polymer film; introducing a polymerizable material (such as a polymerizable acrylate material) into the voids; and polymerizing the polymerizable material to form a polymer, such as an acrylate polymer. In some examples, the voids may include one or more voids formed by removal of a processing material from the polymer film. In some examples, the method may include removal of a processing material from the polymer film. A processing material may be a wax, other hydrocarbon material, or other material used in the fabrication of the membrane.

In some examples, a method of making a polyurethane film includes mixing a thermoplastic polyurethane with an additive material having a substantially different solubility parameter than the thermoplastic polyurethane, and extruding the mixture to form a film. The additive material may include a polymerizable material (such as an acrylate monomer), and in some examples may include a fluoroacrylate monomer. The additive material, or one or more components thereof, may be polymerized before, during, or after the film is formed, for example, by extrusion.

Laboratory tests showed that the presence of processing wax accelerates the movement of a lens fluid through the membrane, and in particular accelerates the movement of a silicone oil through a thermoplastic urethane (TPU) membrane. An example approach to reducing the permeability of membranes, such as TPU membranes, to lens fluids includes removal of any processing materials, such as processing wax.

In representative experiments, one or more of various solvents were used to remove processing wax from a TPU film, including xylene, naphtha, and methanol. The process of wax removal using solvents included the submersion of 100-300 micron-thick TPU membranes in a covered solvent bath and placing the solvent bath in 50° C. laboratory oven. All three solvents successfully removed the processing wax from the membrane, as shown in Table 1 below.

TABLE 1

| Time for solvent to remove wax at 50° C. | | |
|---|---|---|
| Xylene | Naphtha | Methanol |
| 2 hr | 4 hr | 8 hr |

An approximately 1% weight loss was observed after the TPU film was removed from the solvent and dried. For further experimentation, methanol was used as the solvent for removing the processing wax.

After the processing wax was removed from the membrane, an oil-resistant cross-linkable monomer was added to the membrane, along with an initiator, to at least partially fill the free volume within the membrane. Mass transport through the TPU-membrane was achieved using through a two-step process. Firstly the sorption of components (such as a monomer, initiator, and solvent) on the feed side of the membrane, and secondly the diffusion/perfusion of the components throughout the membrane. After solvent evaporation, the monomer may be polymerized (and optionally, cross-linked), for example, using a UV source to obtain photopolymerization, to form a polymer additive that may form a polymer network within the membrane polymer.

One or more of various acrylate monomers were used to form the polymer network. Excellent oil resistant properties were obtained using 2,2,3,3,4,4,5,5,6,6,7,7-dodecafluoroheptyl acrylate, shown as Structure I below. An example improved fluid lens includes a membrane including a membrane material (that may also be termed a matrix material, and may include a membrane polymer) and fluoroacrylate polymer additive formed within the membrane material. The membrane material may include TPU, and the polymer additive may form a network through at least a portion of the membrane polymer.

Structure I

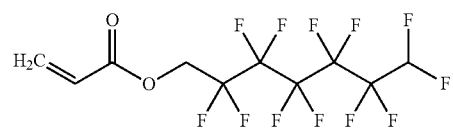

In some experiments, methanol was used as the solvent to remove the processing wax from the membrane. In some experiments, methanol was also used as the carrier solvent for both the fluoroacrylate monomer and its cross-link initiator (phenylbis(2,4,6-trimethylbenzoyl)phosphine oxide, shown in Structure II below Structure II

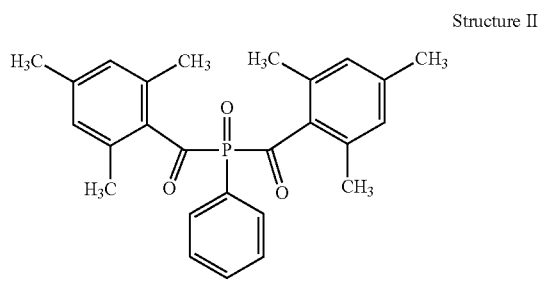

In an experiment, an A3 sized polymer sheet (of membrane polymer) was soaked in a liquid mixture including a perfluoracrylate monomer and an initiator. The monomer and initiator infused into the sheet over a 5 hour period. In some examples, the infusion time may be reduced by heating the liquid mixture. In some examples, the infusion time may be reduced by applying a reduced pressure to the membrane and then allowing components of the liquid mixture to infuse into the membrane. In some examples, a liquid mixture may include an liquid monomer and an initiator. In some examples, a liquid monomer may be used in place of the liquid mixture.

In some examples, a polymerizable material may be infused into the membrane, the membrane may be stretched, and then the polymerizable material may be polymerized into the additive polymer. In some examples, the polymerizable material may be at least partially polymerized before stretching, and any remaining polymerization and any desired cross-linking may be performed after stretching.

A fluid lens may include a deformable element such as a polymer membrane, or other deformable element. A polymer membrane may be an elastomeric polymer membrane. Membrane thicknesses may be in the range 10 microns through 1 mm, for example, between 100 microns and 500 microns.

In some examples, a membrane may be subject to an additional surface treatment. In some examples, a polymer may be applied to the membrane, such as a polymer coating, such as a fluoropolymer coating. A fluoropolymer coating may include one or more fluoropolymers, such as polytetrafluoroethylene or its analogs and derivatives, and/or a fluoroacrylate polymer. In some examples, the polymer coating may have a property, such as a surface energy, that may further reduce diffusion of the lens fluid into the membrane. In some examples, the polymer coating may include one or more polar groups, such as carbonyl, halo (such as fluoro), cyano, hydroxy, carboxylic, or other polar group, where a polar group may include one or more of an oxygen, nitrogen, or halogen atom (such as fluorine, chlorine, or bromine), ionized group, or another electron-withdrawing atom or group. In some examples, a polymer additive may have a similar composition to a polymer coating.

In some examples, one or both surfaces of the membrane may be coated to prevent the ingress of contaminants. For example, the surface of the membrane adjacent the lens fluid may have a coating that reduces or helps substantially prevent ingress of the lens fluid, that may be an oil. In some examples, a coating may include a hydrophobic or hydrophilic material, or other material having a surface energy that tends to repel the lens fluid. For example, a hydrophobic surface may be used with a hydrophilic lens fluid, though this example, like other examples, is not limiting. In some examples, a coating layer may include a fluoropolymer.

However, a coating may be scratched, punctured, otherwise damaged, delaminated from the membrane, or the fluid repellant properties of the coating may be otherwise compromised. Hence, the use of a polymer additive may have advantages over use of a polymer coating, though in some examples one or both may be used. Examples may optionally include a membrane coating, but a separate membrane coating may not be present.

In some examples, a surface layer thickness, such as a coating thickness, and/or one or more polymerization parameters may be varied to provide a spatial variation of mechanical properties, that may be useful for, for example, aspheric fluid lenses and/or gravity sag compensation in fluid lenses. Polymerization parameters may include one or more of degree of polymerization, degree of cross-linking, or composition of the polymerization mixture (e.g., monomer component fractions or proportion of initiator may be spatially varied). In some examples, the membrane surface energy may be modified, by polymerizable material infusion and/or a surface layer, for example, to prevent wetting of the membrane surface by the fluid.

In some examples, a fluid lens may include a substrate. The substrate may be relatively rigid, and may have exhibit no visually perceptible deformation due to, for example, adjusting the internal pressure of the fluid and/or tension on the membrane. In some examples, the substrate may be a generally transparent planar sheet. The substrate may include one more substrate layers, and a substrate layer may include a polymer, glass, optical film, and the like. Example glasses include silicate glasses. In some examples, one or both surfaces of a substrate may be planar, convex, concave, parabolic, or have a freeform surface curvature.

Membrane deformation may be used to adjust an optical parameter, such as a focal length, around a center value determined by relatively fixed surface curvature(s) of a substrate or other optical element, for example, of one or both surfaces of a substrate.

In some examples, the substrate may include an elastomer, and in some examples the substrate may be omitted and the fluid enclosed by a pair of membranes. In some examples, a device may include a second membrane or substrate adapted as described herein to reduce fluid or other contaminant infusion.

In some examples, a fluid lens includes one or more actuators. The one or more actuators may be used to modify the location of control points located around a peripheral region of the membrane, and may hence modify an optical parameter of a fluid lens including the membrane. The membrane may be connected to a substrate around the periphery of the membrane, for example, using a connection assembly. The connection assembly may include one or more of an actuator, a post, a wire, or other connection hardware. In some examples, one or more actuators are used to adjust the curvature of the membrane. This may adjust the optical properties of the fluid lens, such as the optical power of the fluid lens. The membrane, substrate, and an optional edge seal may be used to enclose the fluid within a fluid volume, and the fluid volume may be assumed to be constant for an incompressible fluid, absent thermal expansion.

The techniques described herein may also be applied to any liquid lens that includes a membrane that e at least partially encloses a fluid, such as a gas, gel, liquid, suspension, emulsion, colloid, liquid crystal, or other flowable or otherwise deformable phase. In some examples, similar approaches may be used to reduce gas diffusion through a polymer film. The principles described herein may also be applied to packaging techniques for any gas-sensitive product (such as items sensitive to oxygen), balloons, and the like. In some examples, an example membrane may be a component of a fluid-filled lens, for example, where the fluid is a gas.

Fluid lenses may be incorporated into a variety of different devices, such as ophthalmic devices (e.g., glasses), binoculars, telescopes, cameras, endoscopes, and/or imaging devices. The principles described herein may be applied in connection with any form of fluid lens, Fluid lenses may also be incorporated into eyewear, such as wearable optical devices like eyeglasses, an augmented reality or virtual reality headset, and/or other wearable optical device. Due to these principles described herein, these devices may exhibit reduced thickness, reduced weight, improved wide-angle/field-of-view optics (e.g., for a given weight), and/or improved aesthetics.

The principles described herein may be used in connection with the preparation of membranes with one or more spatially varying physical properties. Applications may include ophthalmic applications, and in any head-mounted device such as an augmented reality and/or virtual reality device. Examples also include fluid lens, such as a liquid lens, that includes a membrane that at least partially encloses a fluid, such as a gas, gel, liquid, suspension, emulsion, colloid, liquid crystal, or other flowable or otherwise deformable phase. In some examples, similar approaches may be used to reduce the diffusion of gas (e.g., air) or lens fluid into or through a polymer film, for example, to reduce oxidation and/or discoloration of the membrane or other lens component. In some examples, a membrane may be treated to reduce or substantially eliminate gravity sag, and also reduce such diffusion effects.

In some examples, a device includes a deformable element such as a membrane (where the deformable element may be in elastic tension), a substrate, a fluid at least partially enclosed between the membrane and the substrate, and a support structure configured to provide a guide path for an edge portion of the deformable element. The tension (e.g., elastic tension, such as line tension) of the deformable element may have a spatial variation configured to compensate for gravity sag within the deformable element. For example, the gravity sag due to the increasing hydrodynamic pressure of fluid along a decreasing height direction may be compensated by a corresponding increase in membrane tension (e.g., that may vary along the same direction as the increase in hydrodynamic pressure). Examples include adjustable fluid lenses including a membrane, where the membrane line tension varies to compensate for variations in the hydrostatic pressure of the fluid.

In some examples, a device includes a membrane having a peripheral portion; a substrate; a fluid at least partially enclosed between the membrane and the substrate; and a support structure configured to provide a guide path for one or more control points located within the peripheral portion of the membrane, where the membrane has a variation of at least one parameter (e.g., one or more of a line tension, elastic constant, thickness, or composition) over a spatial extent of the membrane. The device may be, or include, a wearable device. The variation of at least one parameter may include a monotonic variation of line tension along a particular direction, that may be a vertical direction when the wearable device is worn by a user. In some examples, the membrane may have a variation in membrane thickness along the particular direction, and the variation of line tension may arise, at least in part, from the variation in membrane thickness. In some examples, the membrane may have a variation in membrane composition along the particular direction, and the variation of line tension may arise, at least in part, from the variation in membrane composition.

In some examples, a membrane may have, along one or more directions, a variation in one or more of the following: a degree of cross-linking; a polymer molecular weight; a polymer composition; or an additive fraction. In some examples, a membrane may have a variation of a membrane parameter along the particular direction, the variation of line tension arising from the variation in membrane parameter. In some examples, a membrane may have, along one or more directions, a variation in one or more of the following: a thickness, and/or an elastic constant such as an elastic modulus. The variation in membrane parameter may be produced by a variation in one or more processing parameters including: a conditioning temperature, or a radiation exposure.

In some examples, a device includes a fluid lens assembly, the fluid lens assembly including: a membrane; a substrate; and a fluid at least partially enclosed between the membrane and the substrate, where the fluid has a height-dependent variation in hydrodynamic pressure when the fluid lens assembly is in a particular configuration, and the membrane has a spatial variation in a membrane parameter that substantially eliminates non-uniformity in the membrane's profile due to the height-dependent variation in hydrodynamic pressure. The membrane parameter may include at least one of a membrane thickness, a membrane line tension, or a membrane composition. The spatial variation in the membrane parameter may include a generally linear variation in the membrane parameter along a particular direction.

In some examples, a device may include an adjustable fluid lens assembly includes: a membrane; a substrate; an edge seal; and a fluid enclosed between the membrane, the substrate, and the edge seal; where the membrane has a line tension having a spatial variation configured to compensate for a gravity-induced hydrodynamic pressure variation within the fluid, thereby improving an optical quality of the lens. The device may include an eyewear article, and the line tension decreases with height when the eyewear article is worn by a user.

In some examples, a method of compensating for eye sag in a fluid lens having a membrane includes varying line tension in the membrane based on an expected height-dependent variation in hydrodynamic pressure within the fluid lens. A method of fabricating a fluid lens may include varying a process parameter of a membrane material as a function of position within a sheet of the membrane material; and assembling a fluid lens having a membrane formed from the membrane material. Varying the process parameter may result in a spatial variation in line tension in the membrane of the fluid lens. Varying the process parameter may include varying one or more of: processing temperature, radiation exposure, or composition.

In some examples, a device includes a substrate, a deformable element (such as a membrane), and a fluid enclosed between the substrate and the deformable element, where the deformable element includes a membrane material, such as a membrane polymer, and a polymer network distributed through the membrane material. The device may include a fluid lens, such as an adjustable fluid lens, and may include an adjustable liquid lens. The membrane material may include a thermoplastic polyurethane. The polymer network may include a fluoropolymer, such as a fluoroacrylate or other fluoropolymer. The deformable element may include an elastomeric membrane. The device may include one or more connection assemblies interconnecting the deformable element and the substrate. The device may include at least one actuator, that may be located within or proximate a connection assembly. A connection assembly may include at least one actuator, that may be operable to adjust a curvature of the deformable element. The device may be (or include) an optical instrument, ophthalmic device, other optical element, spectacles, goggles, a visor, an augmented reality headset, a virtual reality headset, a camera, a telescope, binoculars, or a contact lens. In some examples, a device may include a one or more fluid lenses supported by a frame or other support structure configured to support the device on the head of a user.

In some examples, a membrane includes a membrane polymer, and a polymer additive that may extend at least partially through the membrane polymer, for example, as a polymer network. The membrane polymer may include a thermoplastic polyurethane. The polymer additive may include an acrylate polymer. The polymer additive may include a fluoropolymer, such as a fluoroacrylate polymer. In some examples, a fluid lens may include a deformable element, such as a deformable element including a membrane polymer and a polymer additive as described herein. A polymer additive may form a polymer network extending through at least a portion of the membrane polymer. A device, such as an ophthalmic device, may include one or more fluid lenses.

A method of fabricating a polymer element includes exposing a membrane polymer to a fluid mixture including a polymerizable material, and after the polymerizable material has diffused into the membrane polymer, polymerizing the polymerizable material to form the polymer element including a polymer network extending through the membrane polymer. The polymer element may be a polymer membrane, and may be a component of a fluid lens. An example method may be a method of fabricating a fluid lens including the polymer membrane, or a membrane assembly. The polymerizable material may include monomer, such as an acrylate monomer or a fluorinated monomer, and may include a fluoroacrylate monomer. The polymerizable material may include an acrylate, such as a fluoroacrylate. The membrane polymer may include a thermoplastic polyurethane polymer.

Examples include fluid lenses, such as adjustable fluid lenses, membranes used in fluid lenses, polymer films, improved devices using fluid lenses, systems including such devices, and methods of fabricating or operating such examples. Examples include methods of reducing, for example, the fluid permeability of polymer films, such as membranes.

Example embodiments include apparatus, systems, and methods related to fluid lenses. In some examples, the term "fluid lens" may include adjustable fluid-filled lenses, such as adjustable liquid-filled lenses.

In some examples, a fluid lens may include a membrane, a substrate, such as a rigid substrate having a substrate surface, and a fluid located within an enclosure formed at least in part by the membrane and the substrate. The membrane may be an elastic membrane having a membrane profile. The fluid lens may have an optical property that is adjustable by adjusting the membrane profile, for example, by modifying a curvature of the membrane profile. A fluid lens may further include a support structure configured to retain the membrane under tension and allow adjustment of the optical property of the fluid lens by adjusting the membrane profile.

In some examples, a fluid lens includes a substrate (such as a planar substrate, that may be generally rigid), a membrane, that may provide a curved or planar surface, an edge seal, and a support structure. A fluid lens may be a circular lens or non-circular lens. The edge seal may extend around the periphery of a fluid-filled volume and retain (in cooperation with the substrate and the membrane) the fluid within an enclosed fluid volume. The fluid may be enclosed by the substrate and membrane in cooperation with the edge seal. The support structure may provide a guide surface, and may include a guide slot or any other suitable guide structure. An example support structure may include an element that extends around the periphery (or within a peripheral region) of the substrate and attach the membrane to the substrate. The support structure may provide a guide path, such as a guide surface along which a control point (e.g., provided by a membrane attachment located within an edge portion of the membrane) may slide. The support structure may include at least one actuator, and the fluid lens may include one or more actuators that may be located around the periphery of the fluid lens. The at least one actuator may exert a controllable force on the membrane through at least one control point, and may be used to adjust the curvature of the membrane surface and hence the optical properties of the lens (such as focal length, astigmatism correction, cylindricity, parabolic or freeform surface profiles, pincushion distortion, barrel distortion, or any other relevant optical parameter).

In some examples, a fluid lens includes a membrane, a support structure, a substrate, and an edge seal. The support structure may be configured to provide a guide path for an edge portion of the membrane (such as a control point provided by a membrane attachment). An example membrane attachment may function as an interface device, configured to mechanically interconnect the membrane and the support structure, and may allow the membrane to exert an elastic force on the support structure. A membrane attachment may be configured to allow the control point of the membrane (that may be located in an edge portion of the membrane) to move freely along the guide path.

In some examples, a fluid lens (e.g., a liquid lens) may be adjusted by moving each control point of an elastic membrane along a guide path, that may be determined so that the elastic deformation energy of the membrane is substantially unchanged by the adjustment. This may allow for greatly reduced actuation power and a faster response. An example approach uses a guide wire, such as a steel wire with an optional thermoplastic polyurethane (TPU) coating, positioned along the perimeter of the membrane. If the perimeter distance is reduced, the control points of the membrane may move along the guide path towards the substrate.

In some examples, an ophthalmic application of a fluid lens includes a lens frame, an elastic membrane, a substrate, a lens fluid (that may be at least partially enclosed between the elastic membrane and the substrate), an edge seal, and at least one support structure. The substrate may include a generally planar, rigid layer, and may be generally optically transparent. Adjustment of the device configuration and forces applied to the membrane may achieve a planar-convex fluid lens, in which the membrane tends to curve away from the substrate within a central portion. Example lenses may also be configured in planar-concave configurations, in which the membrane tends to curve towards the substrate in a central portion. In some examples, an adjustable fluid-filled lens includes a membrane having a line tension, a peripheral structure (such as a guide wire or support ring) extending around the membrane periphery, a substrate, and an edge seal. The membrane line tension may be supported by the peripheral structure. This may be augmented by a static restraint located at one or more points on the peripheral structure.

Guide devices may be attached to (or formed as part of) the substrate. Sources of elastic energy include hoop stress (tension in azimuth) and line strain, and elastic energy may be exchanged between these as the membrane is adjusted. In some examples, line strain may have a spatial variation configured to counteract the effects of gravity sag. In some examples, an elastic constant, such as an elastic modulus associated with hoop stress and/or line strain, may have a spatial variation, which may be introduced using any approach as described herein.

In some examples, a peripheral structure may generally surround the membrane of a fluid lens, and the fluid may be enclosed by the combination of the substrate, the membrane, and the edge seal. A rigid peripheral structure, such as a rigid support ring, may limit adjustments available to the control points of the membrane. In some examples, a deformable or flexible peripheral structure may be used, such as a peripheral structure including a guide wire, or a flexible support ring (where, in some examples, the term ring may include non-circular shapes, such as the shape of an outer periphery of a spectacle lens).

In some examples, a device includes a membrane, a support structure configured to provide a guide path for an edge portion of the membrane, a membrane attachment (which mechanically connects the membrane to the support structure and allows a control point of the membrane to move freely along the guide path), a substrate, and an edge seal. In some examples, the support structure may be generally rigid and attached to the substrate, and/or to a frame.

In some examples, a fluid lens (that may also be termed a "fluid-filled lens", and may be a liquid lens) includes a fluid, a substrate, and a membrane, with the substrate and the membrane at least partially enclosing the fluid. The fluid within a fluid lens may be referred to as a "lens fluid" or occasionally as a "fluid" for conciseness. The lens fluid may include a liquid, such as an oil, such as a silicone oil, such as a phenylated silicone oil. In some examples, a lens fluid may include a thiol, or a cyano compound.

In some examples, a lens fluid may be (or include) a transparent fluid. In this context, a transparent fluid may have little or substantially no visually perceptible visible wavelength absorption over an operational wavelength range. However, fluid lenses may also be used in the UV and the IR spectrum, and in some examples the fluid used may be generally non-absorbing in the wavelength range of the desired application and may not be transparent over some or all of the visible wavelength range. In some examples, the membrane may be transparent, for example, optically clear at visible wavelengths.

In some examples, a lens fluid may include an oil, such as an optical oil. In some examples, a lens fluid may include one or more of a silicone, a thiol, or a cyano compound. The fluid may include a silicone based fluid, that may sometimes be referred to as a silicone oil. Example lens fluids include aromatic silicones, such as phenylated siloxanes, for example, pentaphenyl trimethyl trisiloxane.

In some examples, a fluid lens includes, for example, a membrane at least partially enclosing a fluid. A fluid may be, or include, one or more of the following: a gas, gel, liquid, suspension, emulsion, vesicle, micelle, colloid, liquid crystal, or any other suitable flowable or otherwise deformable phase.

In some examples, a lens fluid may have a visually perceptible color or absorption, for example, for eye protection use or improvement in visual acuity. In some examples, the lens fluid may have a UV absorbing dye and/or a blue absorbing dye, and the fluid lens may have a slightly yellowish tint. In some examples, a lens fluid may include a dye selected to absorb specific wavelengths, for example, laser wavelengths in the example of laser goggles. In some examples, a device including a fluid lens may be configured as sunglasses, and the lens fluid may include an optical absorber and/or photochromic material. In some examples, a fluid lens may include a separate layer, such as a light absorption layer configured to reduce the light intensity passed to the eye, or protect the eye against specific wavelengths or wavelength bands.

In some examples, an example fluid lens may include a membrane. A membrane may include a thin polymer film, that may have a thickness much less (e.g., more than an order of magnitude less) than the lens radius or other lateral extent of the lens. The membrane may provide a deformable optical surface of an adjustable fluid-filled lens.

A fluid lens may include a deformable element such as a polymer membrane, or any other suitable deformable element. A polymer membrane may include an elastomer polymer, and may be an elastic membrane. Membrane thicknesses may be in the range of 10 microns to 1 mm, for example, between 100 microns and 500 microns. The membrane may be optically clear.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a coating may also modify the elastic properties of a membrane in such a way that gravity sag is reduced or substantially eliminated.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a membrane coating may modify the elastic properties of a membrane in such a way that gravity sag is reduced or substantially eliminated. In some examples, a membrane may have a tension sufficient to keep gravity sag to within a desired limit. For example, a membrane may have a tension in the range 100 N/m to 500 N/m, for instance within the range 200 N/m to 300 N/m.

In some examples, a membrane and/or a substrate may be subject to a surface treatment, such as a coating, that may be provided before or after fluid lens assembly. In some examples, a polymer may be applied to the membrane, such as a polymer coating, for example, a fluoropolymer coating. A fluoropolymer coating may include one or more fluoropolymers, such as polytetrafluoroethylene, or its analogs, blends, or derivatives.

In some examples, a fluid lens may include a substrate. The substrate may provide one exterior surface of an adjustable fluid-filled lens, for example, opposite the surface provided by the membrane, and may include a rigid layer or a rigid lens.

In some examples, the substrate may be relatively rigid, and may exhibit no visually perceptible deformation due to, for example, adjusting the internal pressure of the fluid and/or tension on the membrane. In some examples, the substrate may be a generally transparent planar sheet. The substrate may include one more substrate layers, and a substrate layer may include a polymer, glass, optical film, or the like. Example glasses include silicate glasses, such as borosilicate glasses. In some examples, one or both surfaces of a substrate may be planar, spherical, cylindrical, spherocylindrical, convex, concave, parabolic, or have a freeform surface curvature. One or both surfaces of a substrate may approximate a prescription of a user, and adjustment of the membrane profile may be used to provide an improved prescription, for example, for reading, distance viewing, or any other desired use. In some examples, the substrate may have no significant optical power, for example, by having parallel planar surfaces.

Membrane deformation may be used to adjust an optical parameter, such as a focal length, around a center value determined by relatively fixed surface curvature(s) of a substrate or other optical element, for example, of one or both surfaces of a substrate.

In some examples, the substrate may include an elastomer, and may in some examples have an adjustable profile (that may have a smaller range of adjustments than provided by the membrane), and in some examples the substrate may be omitted and the fluid enclosed by a pair of membranes, or any other suitable flexible enclosure configuration. An example lens may include a pair of membranes at least partially enclosing the lens fluid, and a rigid substrate may be omitted.

In some examples, a fluid lens may include an edge seal, that may include, for example, a deformable component configured to retain the fluid in the lens. The edge seal may connect an edge portion of the membrane to an edge portion of the substrate, and may include a thin flexible polymer film. In some examples, the fluid may be enclosed in a flexible bag, that may provide the edge seal, membrane, and in some examples, a substrate coating. An edge seal may include a flexible polymer film.

In some examples, a fluid lens includes one or more actuators. The one or more actuators may be used to modify the elastic tension of a membrane, and may hence modify an optical parameter of a fluid lens including the membrane. The membrane may be connected to a substrate around the periphery of the membrane, for example, using a connection assembly. The connection assembly may include at least one of an actuator, a post, a wire, or any other suitable connection hardware. In some examples, one or more actuators are used to adjust the curvature of the membrane, and hence the optical properties of the fluid lens.

In some examples, a device including a fluid lens may include a one or more fluid lenses supported by a frame, such as ophthalmic glasses, goggles, visor, or the like. Example fluid lenses may be shaped and sized for use in glasses (e.g., prescription spectacles) or head-mounted displays such as virtual reality devices or augmented reality devices. Example lenses may be the primary viewing lenses of such devices.

Applications of the concepts described herein include fluid lenses and devices that may include one or more fluid lenses, such as ophthalmic devices (e.g., glasses), augmented reality devices, virtual reality devices, and the like. Fluid lenses may be incorporated into eyewear, such as wearable optical devices like eyeglasses, an augmented reality or virtual reality headset, and/or other wearable optical device. Example devices may exhibit reduced thickness, reduced weight, improved field-of-view (e.g., wide angle) optics (e.g., for a given weight), and/or improved aesthetics. In some examples, a device may include at least one lens shaped and/or sized for use in glasses, heads-up displays, augmented reality devices, virtual reality devices, and the like. In some examples, a fluid lens may be a primary viewing lens for the device, for example, a lens through which light from the environment passes before reaching the eye of a user. In some examples, a fluid lens may have a diameter or other analogous dimension (e.g., width or height of a non-circular lens) that is between 20 mm and 80 mm.

In some examples, a substrate may include a coating. In some examples, an interior and/or exterior surface of a substrate and/or membrane may have a coating, such as a polymer coating. In some examples, an exterior surface of a substrate may have a scratch-resistant coating and/or an antireflection coating. In some examples, an interior surface may correspond to an interior surface of an enclosure holding the lens fluid, such as a surface of a membrane or substrate adjacent or substantially adjacent to the lens fluid.

In some examples, a device includes a fluid lens, where the fluid lens includes a membrane having a peripheral portion, a peripheral structure such as a guide wire arranged around the peripheral portion of the membrane, one or more membrane attachments attached to the guide wire, a substrate, a fluid located within an enclosure formed at least in part by the membrane and the substrate, and one or more support structures attached to the substrate. An adjustment of a focal length of the fluid lens may include a movement of the one or more membrane attachments. Each membrane attachment may engage with a respective support structure and allow the movement of the membrane attachment along a guide path. In some examples, the movement of the membrane attachment does not appreciably change an elastic energy of the membrane. In some examples, the membrane may have a spatial variation in one or more membrane parameters, for example, to compensate for gravity sag, and/or provide desired optical properties.

In some examples, a method of fabricating a device may include one or more of the following aspects. A membrane may be stretched in one or more directions, and may be held in a carrier ring or other suitable structure. The membrane may be processed to provide a spatial variation in one or more membrane parameters, before or after stretching, and before or after being held by a carrier ring or similar structure, or a peripheral structure. An example membrane assembly may include a membrane having a spatial variation in one or more membrane parameters, a peripheral structure (e.g., guide wire or support ring), optionally one or more membrane attachments, and any other suitable components. The membrane assembly may be inserted into a substrate assembly, that may include a substrate, support structures, and any other suitable components (e.g., a frame, sensors, filters, coatings, and the like). The substrate assembly may include the lens substrate, and one or more support structures that may be rigidly attached to the substrate. The membrane attachments may be configured to engage with a corresponding support structure. For example, membrane attachments may be located in slots, or engage with posts or other suitable support structures. The membrane tension may be supported by membrane attachments interacting with corresponding guide surfaces, that may be provided by respective support structures. A retaining cover may be fitted into the substrate assembly to increase the stiffness of the structure and/or to provide some other function, for example, a chassis configured to support one or more actuators. An actuator may be configured to provide an urging force to a membrane attachment, and/or may be configured to modify the location of the membrane attachment along the guide path. The retaining cover may have a generally ring-shaped form, or other suitable shape.

In some examples, a method of fabricating a fluid lens includes bonding a guide wire assembly, including a guide wire and a plurality of membrane attachments, to a pre-stretched elastic membrane. The elastic membrane may have a spatial variation in one or more membrane parameters. The membrane may include a membrane polymer and a polymer additive (e.g., an additive polymer network extending through the membrane polymer). The guide wire assembly may then be attached to a substrate assembly including a substrate and a plurality of support structures. The support structures may engage with the membrane attachments to retain an elastic tension in the membrane. The method may further include enclosing a fluid within an enclosure formed at least in part by the substrate and the membrane, to form an adjustable fluid lens. An edge seal may be used to help retain the fluid. A thermoplastic polymer sleeve may be formed on portions of the guide wire located between the membrane attachments. The membrane may be pre-stretched by a mechanical fixture, and the mechanical fixture may be removed after attaching the guide wire assembly to the substrate assembly.

In some examples, an adjustable fluid lens (such as an adjustable liquid lens) may be adjusted by moving at least one control point of an elastic membrane along a guide path. Control points may be provided by at least one membrane attachment. The elastic membrane may include a membrane polymer and a polymer network extending through the membrane polymer. Guide path may be configured so that the elastic deformation energy of the membrane is approximately unchanged by the movement of the membrane attachment. This approach may greatly reduce actuation force and/or device power requirements, and may provide faster response related to adjustment of an optical property of the fluid lens. In some examples, a device includes a peripheral structure (e.g., a guide wire, that may sometimes be referred to as an edge wire) located around a periphery of the membrane. A guide wire may include a metal wire, such as a steel wire, optionally having a thermoplastic polyurethane (TPU) coating. As the membrane attachments move along a respective guide path towards the substrate, the perimeter dimension of the membrane may be reduced, in some examples as the curvature of the membrane profile increases. In some examples, a membrane attachment may include a clevis fastener and/or one or more rollers, for example, using jewel (e.g., synthetic sapphire) wheels, optional surface treatments to reduce friction, and optional flanges to guide the membrane attachments along slots or another guide structure. The number of actuation points may be selected based on various factors, for example, the degree of "scalloping" (curved edges) between membrane attachments. The scalloped regions may be hidden by eyeglass frames. Numerical modeling with 20 attachment points showed good optical performance, though other numbers of attachment points may be used, for example, 8-30, such as 20-30. Fabrication may include attachment of the guide wire to the membrane using acoustic welding, optionally followed by laser trimming.

In some examples, a method of operating an adjustable fluid lens, including a membrane that includes a membrane polymer and a polymer network extending through the membrane polymer, membrane attachments, and support structures configured to engage with a corresponding membrane attachment, may include moving at least one membrane attachment along a guide path determined by the corresponding support structure. In this context, a membrane attachment may physically interact with corresponding support structure, for example, extending through and/or around the corresponding support structure. Applications include ophthalmic devices, optical device, and other applications of liquid lenses.

Example Embodiments

Example 1: A device may include 1. A device including a fluid lens, where the fluid lens includes: a membrane; a substrate; and a fluid located within an enclosure formed at least in part by the membrane and the substrate; where the fluid lens is an adjustable fluid lens, and the membrane has a spatial variation in at least one membrane parameter along a particular direction that compensates for gravity sag in the membrane.

Example 2. The device of example 1, where the device is a head-mounted device.

Example 3. The device of any of examples 1-2, where the device is an ophthalmic device configured to be used as eyewear, an augmented reality device, or a virtual reality device.

Example 4. The device of any of examples 1-3, where the fluid lens is sized for use with a human eye, and the fluid lens has a diameter, width, or analogous dimension of between approximately 20 mm and approximately 80 mm.

Example 5. The device of any of examples 1-4, where the at least one membrane parameter includes at least one of a membrane thickness, a membrane composition, a membrane elastic constant, or a membrane tension.

Example 6. The device of any of examples 1-5, where the at least one membrane parameter includes a membrane thickness.

Example 7. The device of any of examples 1-6, where the membrane has a lower portion having a greater membrane thickness.

Example 8. The device of any of examples 1-7, where the membrane thickness has a generally linear variation in membrane thickness extending across the membrane along the particular direction.

Example 9. The device of any of examples 1-8, where the at least one membrane parameter includes an elastic constant of the membrane.

Example 10. The device of example 9, where the elastic constant is an elastic modulus of the membrane.

Example 11. The device of any of examples 1-10, where the at least one membrane parameter includes a membrane composition.

Example 12. The device of any of examples 1-11, where the membrane includes a membrane polymer, and the membrane composition includes a degree of cross-linking within the membrane polymer.

Example 13. The device of any of examples 1-12, where the membrane includes a membrane polymer and an additive, and the membrane composition includes a weight percentage of the additive within the membrane.

Example 14. The device of any of examples 1-13, where the device further includes: a peripheral structure disposed around a periphery of the membrane; at least one membrane attachment attached to the peripheral structure; and at least one support structure configured to engage with a respective membrane attachment of the at least one membrane attachment, where: the fluid lens is configured such that movement of the at least one membrane attachment relative to the substrate adjusts an optical property of the fluid lens; the membrane is an elastic membrane; and the at least one membrane parameter includes an elastic tension within the membrane.

Example 15. The device of any of examples 1-14, where each of the at least one support structure provides a guide path for a respective membrane attachment of the at least one membrane attachment, where each respective membrane attachment is moveable along the guide path to adjust the optical property of the lens.

Example 16. The device of any of examples 1-15, further including an edge seal, where the edge seal is configured to retain the fluid between the substrate and the membrane, and where the substrate is an optically transparent substrate, the membrane is an optically transparent membrane, and the fluid includes an optically transparent liquid.

Example 17. A method, including: forming a membrane having a spatial variation in at least one membrane parameter along a particular direction; and assembling a device, the device including a fluid lens including the membrane, where the spatial variation in the at least one membrane parameter along the particular direction compensates for gravity sag in the membrane of the fluid lens.

Example 18. The method of example 17, where the spatial variation in the at least one membrane parameter along the particular direction includes a variation in an elastic constant of the membrane along the particular direction, and assembling the device includes configuring the fluid lens so that the elastic constant of the membrane is generally greater within a lower portion of the fluid lens.

Example 19. The method of any of examples 17-18, where the at least one membrane parameter includes a membrane thickness, and assembling the device includes configuring the fluid lens so that the membrane thickness is generally greater within a lower portion of the fluid lens.

Example 20. The method of any of examples 17-19, where the at least one membrane parameter includes at least one of: a membrane composition; a treatment temperature of the membrane; or a lens fluid absorption of the membrane.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of that may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (e.g., augmented-reality system 2400 in FIG. 24) or that visually immerses a user in an artificial reality (e.g., virtual-reality system 2500 in FIG. 25). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 24, augmented-reality system 2400 may include an eyewear device 2402 with a frame 2410 configured to hold a left display device 2415(A) and a right display device 2415(B) in front of a user's eyes. Display devices 2415(A) and 2415(B) may act together or independently to present an image or series of images to a user. While augmented-reality system 2400 includes two displays, embodiments of this disclosure may be implemented in augmented-reality systems with a single NED or more than two NEDs.

In some embodiments, augmented-reality system 2400 may include one or more sensors, such as sensor 2440. Sensor 2440 may generate measurement signals in response to motion of augmented-reality system 2400 and may be located on substantially any portion of frame 2410. Sensor 2440 may represent a position sensor, an inertial measurement unit (IMU), a depth camera assembly, a structured light emitter and/or detector, or any combination thereof. In some embodiments, augmented-reality system 2400 may or may not include sensor 2440 or may include more than one sensor. In embodiments in which sensor 2440 includes an IMU, the IMU may generate calibration data based on measurement signals from sensor 2440. Examples of sensor 2440 may include, without limitation, accelerometers, gyroscopes, magnetometers, other suitable types of sensors that detect motion, sensors used for error correction of the IMU, or some combination thereof.

Augmented-reality system 2400 may also include a microphone array with a plurality of acoustic transducers 2420(A)-2420(J), referred to collectively as acoustic transducers 2420. Acoustic transducers 2420 may be transducers that detect air pressure variations induced by sound waves. Each acoustic transducer 2420 may be configured to detect sound and convert the detected sound into an electronic format (e.g., an analog or digital format). The microphone array in FIG. 2 may include, for example, ten acoustic transducers: 2420(A) and 2420(B), that may be designed to be placed inside a corresponding ear of the user, acoustic transducers 2420(C), 2420(D), 2420(E), 2420(F), 2420(G), and 2420(H), that may be positioned at various locations on frame 2410, and/or acoustic transducers 2420(I) and 2420(J), that may be positioned on a corresponding neckband 2405.

In some embodiments, one or more of acoustic transducers 2420(A)-(F) may be used as output transducers (e.g., speakers). For example, acoustic transducers 2420(A) and/or 2420(B) may be earbuds or any other suitable type of headphone or speaker.

The configuration of acoustic transducers 2420 of the microphone array may vary. While augmented-reality system 2400 is shown in FIG. 24 as having ten acoustic transducers 2420, the number of acoustic transducers 2420 may be greater or less than ten. In some embodiments, using higher numbers of acoustic transducers 2420 may increase the amount of audio information collected and/or the sensitivity and accuracy of the audio information. In contrast, using a lower number of acoustic transducers 2420 may decrease the computing power required by an associated controller 2450 to process the collected audio information. In addition, the position of each acoustic transducer 2420 of the microphone array may vary. For example, the position of an acoustic transducer 2420 may include a defined position on the user, a defined coordinate on frame 2410, an orientation associated with each acoustic transducer 2420, or some combination thereof.

Acoustic transducers 2420(A) and 2420(B) may be positioned on different parts of the user's ear, such as behind the pinna, behind the tragus, and/or within the auricle or fossa. Or, there may be additional acoustic transducers 2420 on or surrounding the ear in addition to acoustic transducers 2420 inside the ear canal. Having an acoustic transducer 2420 positioned next to an ear canal of a user may enable the microphone array to collect information on how sounds arrive at the ear canal. By positioning at least two of acoustic transducers 2420 on either side of a user's head (e.g., as binaural microphones), augmented-reality system 2400 may simulate binaural hearing and capture a 3D stereo sound field around about a user's head. In some embodiments, acoustic transducers 2420(A) and 2420(B) may be connected to augmented-reality system 2400 via a wired connection 2430, and in other embodiments acoustic transducers 2420(A) and 2420(B) may be connected to augmented-reality system 2400 via a wireless connection (e.g., a Bluetooth connection). In still other embodiments, acoustic transducers 2420(A) and 2420(B) may not be used at all in conjunction with augmented-reality system 2400.

Acoustic transducers 2420 on frame 2410 may be positioned along the length of the temples, across the bridge, above or below display devices 2415(A) and 2415(B), or some combination thereof. Acoustic transducers 2420 may be oriented such that the microphone array is able to detect sounds in a wide range of directions surrounding the user wearing the augmented-reality system 2400. In some embodiments, an optimization process may be performed during manufacturing of augmented-reality system 2400 to determine relative positioning of each acoustic transducer 2420 in the microphone array.

In some examples, augmented-reality system 2400 may include or be connected to an external device (e.g., a paired device), such as neckband 2405. Neckband 2405 generally represents any type or form of paired device. Thus, the following discussion of neckband 2405 may also apply to various other paired devices, such as charging cases, smart watches, smart phones, wrist bands, other wearable devices, hand-held controllers, tablet computers, laptop computers, other external compute devices, etc.

As shown, neckband 2405 may be coupled to eyewear device 2402 via one or more connectors. The connectors may be wired or wireless and may include electrical and/or non-electrical (e.g., structural) components. In some cases, eyewear device 2402 and neckband 2405 may operate independently without any wired or wireless connection between them. While FIG. 24 illustrates the components of eyewear device 2402 and neckband 2405 in example locations on eyewear device 2402 and neckband 2405, the components may be located elsewhere and/or distributed differently on eyewear device 2402 and/or neckband 2405. In some embodiments, the components of eyewear device 2402 and neckband 2405 may be located on one or more additional peripheral devices paired with eyewear device 2402, neckband 2405, or some combination thereof.

Pairing external devices, such as neckband 2405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2400 may be provided by a paired device or shared between a paired device and an eyewear device, thus reducing the weight, heat profile, and form factor of the eyewear device overall while still retaining desired functionality. For example, neckband 2405 may allow components that would otherwise be included on an eyewear device to be included in neckband 2405 since users may tolerate a heavier weight load on their shoulders than they would tolerate on their heads. Neckband 2405 may also have a larger surface area over which to diffuse and disperse heat to the ambient environment. Thus, neckband 2405 may allow for greater battery and computation capacity than might otherwise have been possible on a stand-alone eyewear device. Since weight carried in neckband 2405 may be less invasive to a user than weight carried in eyewear device 2402, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 2405 may be communicatively coupled with eyewear device 2402 and/or to other devices. These other devices may provide certain functions (e.g., tracking, localizing, depth mapping, processing, storage, etc.) to augmented-reality system 2400. In the embodiment of FIG. 24, neckband 2405 may include two acoustic transducers (e.g., 2420(I) and 2420(J)) that are part of the microphone array (or potentially form their own microphone subarray). Neckband 2405 may also include a controller 2425 and a power source 2435.

Acoustic transducers 2420(I) and 2420(J) of neckband 2405 may be configured to detect sound and convert the detected sound into an electronic format (analog or digital). In the embodiment of FIG. 24, acoustic transducers 2420(I) and 2420(J) may be positioned on neckband 2405, thereby increasing the distance between the neckband acoustic transducers 2420(I) and 2420(J) and other acoustic transducers 2420 positioned on eyewear device 2402. In some cases, increasing the distance between acoustic transducers 2420 of the microphone array may improve the accuracy of beamforming performed via the microphone array. For example, if a sound is detected by acoustic transducers 2420(C) and 2420(D) and the distance between acoustic transducers 2420(C) and 2420(D) is greater than, for example, the distance between acoustic transducers 2420(D) and 2420(E), the determined source location of the detected sound may be more accurate than if the sound had been detected by acoustic transducers 2420(D) and 2420(E).

Controller 2425 of neckband 2405 may process information generated by the sensors on neckband 2405 and/or augmented-reality system 2400. For example, controller 2425 may process information from the microphone array that describes sounds detected by the microphone array. For each detected sound, controller 2425 may perform a direction-of-arrival (DOA) estimation to estimate a direction from which the detected sound arrived at the microphone array. As the microphone array detects sounds, controller 2425 may populate an audio data set with the information. In embodiments in which augmented-reality system 2400 includes an inertial measurement unit, controller 2425 may compute all inertial and spatial calculations from the IMU located on eyewear device 2402. A connector may convey information between augmented-reality system 2400 and neckband 2405 and between augmented-reality system 2400 and controller 2425. The information may be in the form of optical data, electrical data, wireless data, or any other transmittable data form. Moving the processing of information generated by augmented-reality system 2400 to neckband 2405 may reduce weight and heat in eyewear device 2402, making it more comfortable to the user.

Power source 2435 in neckband 2405 may provide power to eyewear device 2402 and/or to neckband 2405. Power source 2435 may include, without limitation, lithium ion batteries, lithium-polymer batteries, primary lithium batteries, alkaline batteries, or any other form of power storage. In some cases, power source 2435 may be a wired power source. Including power source 2435 on neckband 2405 instead of on eyewear device 2402 may help better distribute the weight and heat generated by power source 2435.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 2500 in FIG. 25, that mostly or completely covers a user's field of view. Virtual-reality system 2500 may include a front rigid body 2502 and a band 2504 shaped to fit around a user's head. Virtual-reality system 2500 may also include output audio transducers 2506(A) and 2506(B). Furthermore, while not shown in FIG. 25, front rigid body 2502 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 2400 and/or virtual-reality system 2500 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial reality systems may include a single display screen for both eyes or may provide a display screen for each eye, that may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay light (to, e.g., the viewer's eyes). These optical subsystems may be used in a non-pupil-forming architecture (such as a single lens configuration that directly collimates light but may result in so-called pincushion distortion) and/or a pupil-forming architecture (such as a multi-lens configuration that may produce barrel distortion to nullify pincushion distortion).

In addition to or instead of using display screens, some artificial reality systems may include one or more projection systems. For example, display devices in augmented-reality system 2400 and/or virtual-reality system 2500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

Artificial reality systems may also include various types of computer vision components and subsystems. For example, augmented-reality system 2400 and/or virtual-reality system 2500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. For example, elements 2506(A), and 2506(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some examples, artificial reality systems may include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The present disclosure may anticipate or include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps.

In some examples, a system according to the present disclosure may include at least one physical processor and physical memory including computer-executable instructions that, when executed by the physical processor, cause the physical processor to perform an operation, such as at least one of adjusting the optical properties of a fluid lens (e.g., by energizing an actuator), displaying an augmented reality or virtual reality image, providing haptic feedback using one or more transducers, or any other appropriate operation.

In some examples, a non-transitory computer-readable medium according to the present disclosure may include one or more computer-executable instructions that, when executed by at least one processor of a computing device, cause the computing device to perform an operation, such as at least one of adjusting the optical properties of a fluid lens (e.g., by energizing an actuator), displaying an augmented reality or virtual reality image, providing haptic feedback using one or more transducers, or any other appropriate operation.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. An example function may include at least one of adjusting the focal length of an adjustable lens, actuating an actuator, modifying an optical absorption of an optical element, modifying a membrane profile of an adjustable fluid lens, providing augmented reality or virtual reality image elements, or other function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Features from any of the embodiments described herein may be used in combination with one another in accordance with the general principles described herein. These and other embodiments, features, and advantages will be more fully understood upon reading the following detailed description in conjunction with the accompanying drawings and claims.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

What is claimed is:

1. A device comprising a fluid lens, wherein the fluid lens comprises:
    a membrane;
    a substrate; and
    a fluid located within an enclosure formed at least in part by the membrane and the substrate; wherein:
    the fluid lens is an adjustable fluid lens having a maximum optical power, a minimum optical power, and a mid-range optical power located between the maximum optical power and the minimum optical power;
    the membrane has a spatial variation in at least one membrane parameter along a particular direction that compensates for gravity sag in the membrane when the fluid lens is adjusted to the mid-range optical power;
    the at least one membrane parameter includes a membrane thickness; and
    the membrane thickness has a linear variation with height with the membrane thickness being greater in a lower portion of the membrane when the device is worn by a user in a standing position.

2. The device of claim 1, wherein the device is a head-mounted device.

3. The device of claim 1, wherein the device is an ophthalmic device configured to be used as eyewear, an augmented reality device, or a virtual reality device.

4. The device of claim 1, wherein the fluid lens is sized for use with a human eye, and the fluid lens has a diameter, width, or analogous dimension of between approximately 20 mm and approximately 80 mm.

5. The device of claim 1, wherein the at least one membrane parameter includes the membrane thickness and at least one of a membrane composition, a membrane elastic constant, or a membrane tension.

6. The device of claim 1, wherein the membrane thickness has a generally linear variation in membrane thickness extending across the membrane along the particular direction, wherein the particular direction is a vertical direction when the device is worn by the user.

7. The device of claim 1, wherein the at least one membrane parameter includes an elastic constant of the membrane.

8. The device of claim 7, wherein the elastic constant is an elastic modulus of the membrane.

9. The device of claim 1, wherein the at least one membrane parameter includes a membrane composition.

10. The device of claim 9, wherein the membrane includes a membrane polymer, and the membrane composition includes a degree of cross-linking within the membrane polymer.

11. The device of claim 9, wherein the membrane includes a membrane polymer and an additive, and the membrane composition includes a weight percentage of the additive within the membrane.

12. The device of claim 1, wherein the device further includes:
    a peripheral structure disposed around a periphery of the membrane;
    at least one membrane attachment attached to the peripheral structure; and
    at least one support structure configured to engage with a respective membrane attachment of the at least one membrane attachment, wherein:
    the fluid lens is configured such that movement of the at least one membrane attachment relative to the substrate adjusts an optical property of the fluid lens;
    the membrane is an elastic membrane; and
    the at least one membrane parameter includes an elastic tension within the membrane.

13. The device of claim 12, wherein each of the at least one support structure provides a guide path for a respective membrane attachment of the at least one membrane attachment,
    wherein each respective membrane attachment is moveable along the guide path to adjust the optical property of the lens.

14. The device of claim 1, further comprising an edge seal, wherein the edge seal is configured to retain the fluid between the substrate and the membrane, and wherein
    the substrate is an optically transparent substrate,
    the membrane is an optically transparent membrane, and
    the fluid includes an optically transparent liquid.

15. A method, comprising:
    forming a membrane having a spatial variation in at least one membrane parameter along a particular direction; and
    assembling a device, the device including a fluid lens comprising the membrane,
    wherein:
    the fluid lens is an adjustable fluid lens having a maximum optical power, a minimum optical power, and a mid-range optical power located between the maximum optical power and the minimum optical power;
    the spatial variation in the at least one membrane parameter along the particular direction compensates for gravity sag in the membrane of the fluid lens membrane when the fluid lens is adjusted to the mid-range optical power;
    the at least one membrane parameter includes a membrane thickness; and
    the membrane thickness has a linear variation with height with the membrane thickness being greater in a lower portion of the membrane when the device is worn by a user in a standing position.

16. The method of claim 15, wherein
    the spatial variation in the at least one membrane parameter along the particular direction includes a variation in an elastic constant of the membrane along the particular direction, and
    assembling the device includes configuring the fluid lens so that the elastic constant of the membrane is generally greater within the lower portion of the fluid lens.

17. The method of claim 15, wherein
    the at least one membrane parameter includes a membrane thickness, and
    assembling the device includes configuring the fluid lens so that the membrane thickness is generally greater within the lower portion of the fluid lens.

18. The method of claim 15, wherein the at least one membrane parameter further includes at least one of:
    a membrane composition;
    a treatment temperature of the membrane; or
    a lens fluid absorption of the membrane.

* * * * *